(12) United States Patent
Kinoshita

(10) Patent No.: US 8,726,158 B2
(45) Date of Patent: May 13, 2014

(54) USER INTERFACE GENERATION APPARATUS

(75) Inventor: Kenta Kinoshita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 233 days.

(21) Appl. No.: 13/060,626

(22) PCT Filed: Aug. 27, 2009

(86) PCT No.: PCT/JP2009/065007
§ 371 (c)(1),
(2), (4) Date: Feb. 24, 2011

(87) PCT Pub. No.: WO2010/024357
PCT Pub. Date: Mar. 4, 2010

(65) Prior Publication Data
US 2011/0167363 A1 Jul. 7, 2011

(30) Foreign Application Priority Data
Aug. 28, 2008 (JP) ................................. 2008-220515

(51) Int. Cl.
*G06F 3/00* (2006.01)
*G06F 3/14* (2006.01)

(52) U.S. Cl.
USPC .......................................... 715/716; 715/864

(58) Field of Classification Search
USPC .......................... 715/763–764, 863, 716, 864
See application file for complete search history.

(56) References Cited

U.S. PATENT DOCUMENTS

| | | | |
|---|---|---|---|
| 6,765,590 B1 * | 7/2004 | Watahiki et al. | 715/716 |
| 2005/0172228 A1 * | 8/2005 | Kakuda | 715/530 |
| 2007/0101297 A1 * | 5/2007 | Forstall et al. | 715/841 |
| 2008/0100591 A1 * | 5/2008 | Nezu et al. | 345/173 |
| 2008/0180457 A1 * | 7/2008 | Yamazaki | 345/619 |

FOREIGN PATENT DOCUMENTS

| | | |
|---|---|---|
| CN | 1692673 A | 11/2005 |
| JP | A-06-083522 | 3/1994 |
| JP | A-2001-036652 | 2/2001 |
| JP | A-2004-235962 | 8/2004 |

OTHER PUBLICATIONS

"Correspond" and "Agree" The American Heritage Dictionary of the English Language. Boston: Houghton Mifflin, 2007. Credo Reference. Dec. 12, 2007. Web. Dec. 5, 2012. <http://www.credoreference.com/entry/hmdictenglang/correspond>.*
"Correspond." Chambers 21st Century Dictionary. London: Chambers Harrap, 2001. Credo Reference. Jan. 1, 2002. Web. Dec. 5, 2012. <http://www.credoreference.com/entry/chambdict/correspond>.*
English-language Abstract of KR-10-2005-0091992 A; Published Sep. 16, 2005 in the name of Kakuda Hiroishi.

(Continued)

*Primary Examiner* — Steven Sax
*Assistant Examiner* — Wilson Varga
(74) *Attorney, Agent, or Firm* — Oliff PLC

(57) ABSTRACT

A user interface generation apparatus is provided, the apparatus being capable of switching over between a compound user interface and a stand-alone user interface by simple operations. When an input unit receives a second input while a control unit controls to display a compound user interface object group, the control unit controls to display a stand-alone user interface object group of a user interface displayed correspondingly to a reception position of the second input in the compound user interface object group.

5 Claims, 22 Drawing Sheets

(56) References Cited

OTHER PUBLICATIONS

Chinese Office Action issued in Application No. 200980133446.9; Dated Aug. 31, 2012 (With Translation).
Korean Office Action issued in Application No. 10-2011-7004504; Dated Aug. 28, 2012 (With Translation).
International Search Report issued in Application No. PCT/JP2009/065007; Dated Dec. 15, 2009 (With Translation).
Nov. 13, 2012 Office Ation issued in Japanese Patent Application No. 2010-526769 (with translation.).
Jun. 3, 2013 Office Action issued in Chinese Patent Application No. 200980133446.9 (with translation).
Dec. 3, 2013 Office Action issued in Chinese Application No. 200980133446.9.

* cited by examiner

FIG. 16
(A)
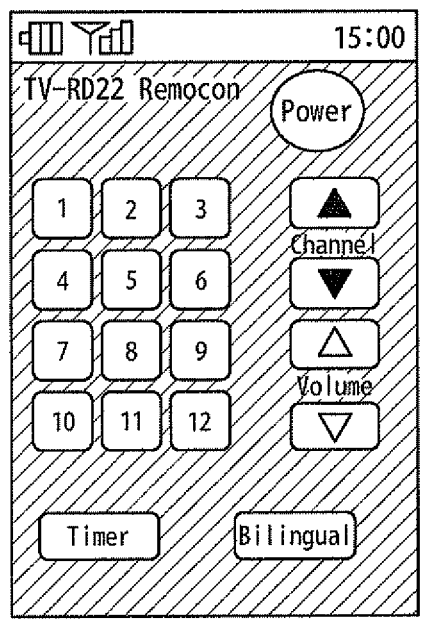
(B)
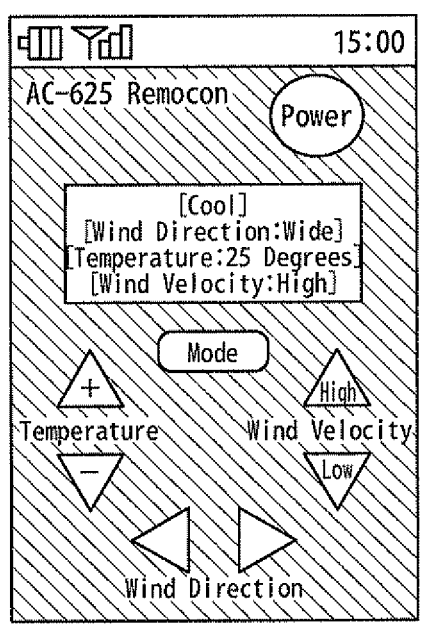

FIG. 17
(A)
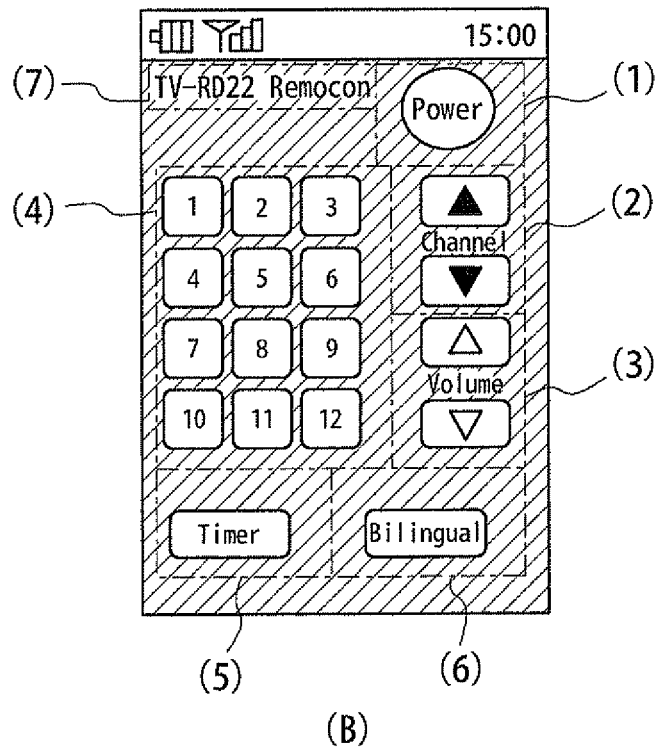
(B)
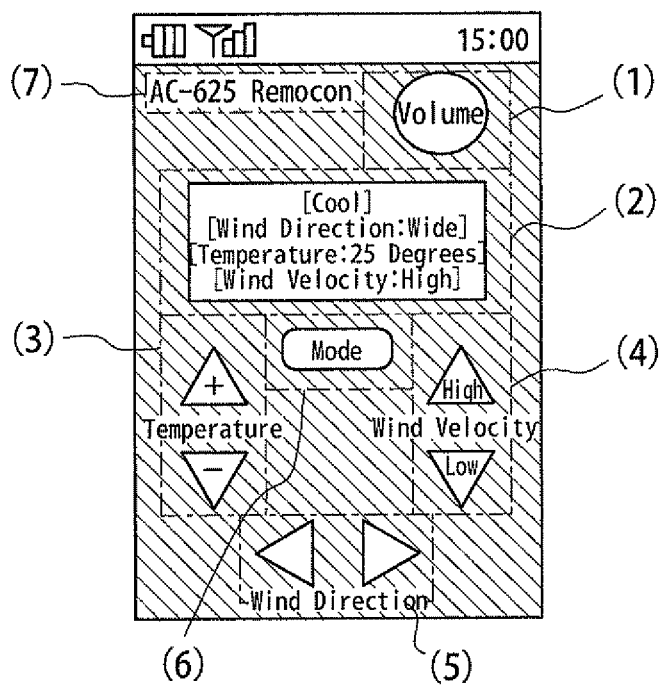

FIG. 22
(A)
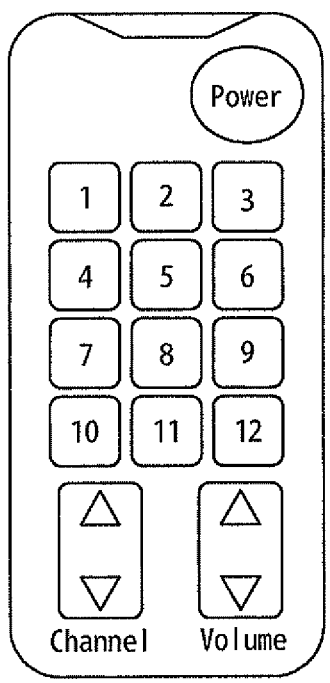
(B)
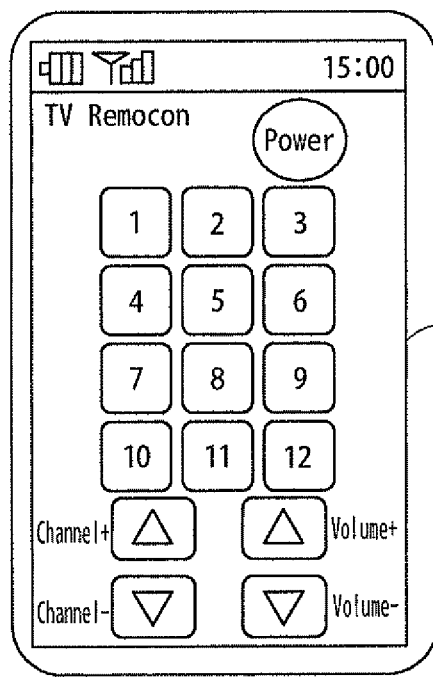
(C)
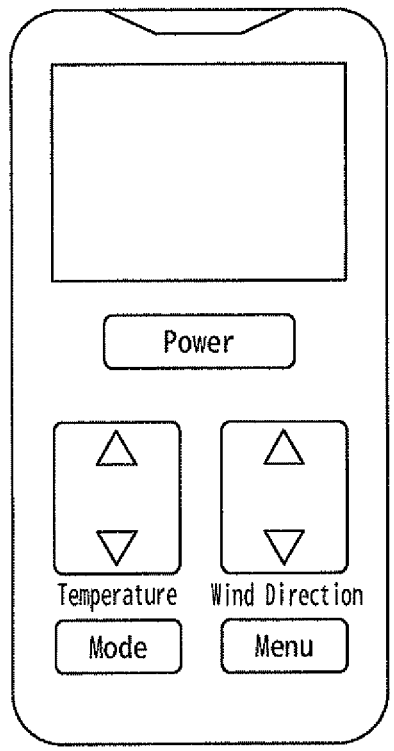
(D)
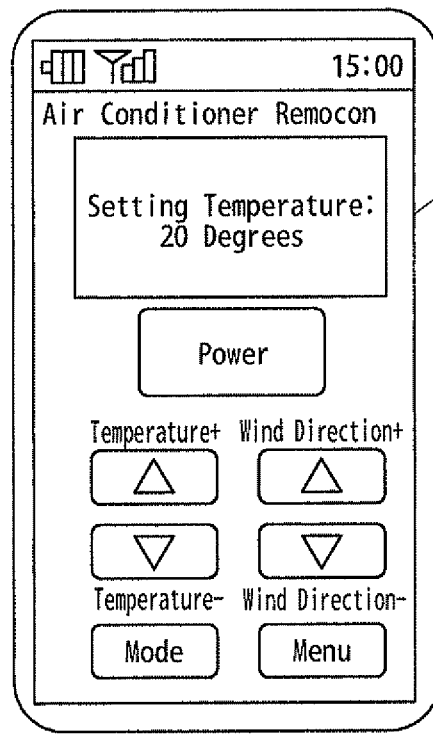

USER INTERFACE GENERATION APPARATUS

CROSS REFERENCE TO RELATED APPLICATION

This application claims priority to and the benefit of Japanese Patent Application No. 2008-220515 (filed on Aug. 28, 2008), the entire contents of which are incorporated herein by reference.

TECHNICAL FIELD

The present invention relates to user interface generation apparatuses, and particularly, to user interface generation apparatuses for generating user interfaces of mobile terminals.

BACKGROUND ART

The user interface (hereinafter, arbitrarily abbreviated to "UI") of the mobile terminal represented by a mobile phone has a great influence on operability when a user operates the mobile terminal. Accordingly, the UI of the mobile terminal is one of important factors for the user to purchase the mobile terminal.

With significant multi-functioning of the mobile terminal in recent years, there are numerous mobile terminals having picturesque UIs using animation and 3D display. In addition, there are mobile terminals having UIs which can be customized as desired by users. Such mobile terminals dramatically improve convenience for the users.

Conventional mobile terminals generally have UI designs and operation methods which are different between manufacturers and between models. That is, the UI is unique to each terminal and most of the conventional mobile terminals have UI highly dependent on models. Therefore, when program codes of another terminal are reused in developing a terminal, it leads to voluminous change in parts of the UI to the program codes. Accordingly, it has been difficult to port program codes of a terminal to another terminal.

In order to deal with such a problem, a UI based on XML (Extensible Markup Language) has been introduced. Expressing the UI by using an XML file whose description method is standardized facilitates reuse of the program codes and enables to port the UI to another model. Accordingly, it also enables to deal with UI alone independently from each terminal, such that the UI can be used by terminals of different models and different manufactures.

Representatives of such XML-based UI are UI Foundation developed by TAT (http://www.tat.se/), VIVID UI developed by Acrodea, Inc. (http://www.acrodea.co.jp/), UI One developed by Qualcomm Incorporated (http://www.qualcomm.co.jp/) and the like.

In addition, with multi-functioning and high-performance of a terminal body, an increasing number of recent mobile terminals mount OS (Operating System) which can perform a multi-task processing for simultaneously executing a plurality of tasks in parallel. Moreover, mobile terminals with multi-window function to multiplex output screen displays by allocating multiple tasks processed in parallel and simultaneously to respective display areas (windows), have been becoming widely used.

Incidentally, there is a technique, which has been disclosed, for remote operation (control) of a plurality of external equipments by infrared communication using a mobile terminal having an infrared communication unit (see, for example, Patent Document 1). The mobile phone terminal of Patent Document 1 is provided with an external control unit for communicating with the external equipments. This mobile phone terminal stores the external equipment control information for remotely controlling the external equipments, obtained via a telephone line or received from the external equipments, and remotely controls the external equipments based on the external equipment control information. That is, by changing an application program (hereinafter, referred to as "application" simply) incorporated in the terminal, the terminal body, which is normally used as a mobile phone, can be used as a remote controller (hereinafter, referred to as "remocon" simply) for remotely controlling the plurality of external equipments.

PRIOR ART DOCUMENT

Patent Document

Patent Document 1: Japanese Patent Laid-Open No. 2001-36652

SUMMARY OF INVENTION

Technical Problem

According to the mobile phone terminal disclosed in the above Patent Document 1, a single mobile phone terminal can remotely control a plurality of external equipments based on respective external equipment control information corresponding to the external equipments. Therefore, there is no need to do cumbersome operation for the user to separately use individual remocon terminals for the plurality of external equipments, which improves convenience for the user.

If such functions of the remocon capable of remotely switching between the plurality of external equipments to be controlled remotely is implemented in the mobile terminal capable of multi-task processing stated above, it is not necessary to exit a remocon application to initiate another remocon application. That is, it is possible to initiate a plurality of applications on a single terminal and to use a desired remocon application among them timely.

However, the operation to switch the plurality of applications frequently is cumbersome.

If the multi-windows function stated above is embedded in the mobile terminal, UIs for operating the plurality of applications can be displayed on the plurality of windows, respectively. Thereby, it is possible to use the applications on a single screen simultaneously without switching among the plurality of applications.

That is, for a TV remocon terminal alone as shown in FIG. 22(A), for example, a UI of TV remocon application may be reproduced on a touch panel 200 of a mobile terminal 100, for example, while maintaining operability of the TV remocon terminal, as shown in FIG. 22(B). While keys such as numerical keys or buttons of the remocon terminal shown in FIG. 22(A) are mechanical keys, numerical keys or buttons of the mobile terminal 100 shown in FIG. 22(B) are reproduced as objects and displayed on the touch panel 200. Hereinafter, a variety of keys or buttons and information displaying spots composing the UI displayed on the touch panel are referred to as "UI object". Similarly, for an air conditioner remocon terminal alone as shown in FIG. 22(C), a UI of air conditioner remocon application may be reproduced on the touch panel 200 of the mobile terminal 100, while maintaining operability of the air conditioner remocon terminal, as shown in FIG. 22(D). Moreover, if each UI of application is described in XML as the basis, almost the same UI can be easily reproduced in another terminal only by processing the XML file describing the UI, even if the application is ported to the another terminal of a different manufacturer.

However, in order to operate an air conditioner while viewing a TV in the above example, there may be a need for cumbersome operations for both of the TV and the air conditioner. In such a case, the applications for both the TV and the air conditioner may be displayed simultaneously by dividing a display area of the display unit by using the multi-task function and the multi-window function. However, simultaneous display of the UIs results in displays as shown in FIG. 23(A) to (D), as each application has only the UI which assumed to be used solely.

FIG. 23(A) to (D) are diagrams illustrating states when the UIs of two applications are simultaneously displayed by using the mobile terminal 100 having the multi-task function and the multi-window function. In the examples shown in the figures, only a part of each UI is displayed, as each of the UIs is reproduced as it stands in each of the windows vertically separating the display unit of the touch panel 200. A scroll bar is provided on the right in each window so as to enable operation of parts beyond the screen.

In order to adjust volume of the TV in a state shown as FIG. 23(A), for example, the user needs to move the scroll bar in the window of the TV remocon UI so as to move a displayed area of the TV remocon UI, as shown in FIG. 23(B). Similarly, in order to adjust temperature of the air conditioner in a state shown as FIG. 23(C), for example, the user needs to move the scroll bar in the window of the air conditioner remocon UI so as to move a displayed area of the air conditioner remocon UI, as shown in FIG. 23(D). Moreover, when initiating a plurality of applications by using the multi-window function, and if UIs are displayed being overlapped with one another, it is necessary to select and activate a window before starting an input operation.

The terminal body of the mobile terminal in particular is designed to be compact, thus an area usable by either UI constituted of the touch panel or UI constituted of physical keys is very limited. Therefore, an operation unit constituting the UI of the application such as the remocon is generally designed in a minimum size. Accordingly, it is not realistic to reduce each UI entirely in order to display UIs of a plurality of applications at the same time.

As above, if the UI designed for a single screen and assumed to be used alone (hereinafter, appropriately abbreviated to "stand-alone UI") is displayed by using the multi-window function, operability of the UI is spoiled.

In order to address such a problem, it may be considered to generate a UI compounded (hereinafter, abbreviated to a "compound UI"), composed of UI objects selected from UI objects such as keys and buttons, that are components of each stand-alone UI. For example, it may be considered to generate a compound UI as shown in FIG. 24 by selecting predetermined UI objects from the TV remocon application UI shown in FIG. 22(B) and the air conditioner remocon application UI shown in FIG. 22(D). The mobile terminal 100 shown in FIG. 24 shows an example in which predetermined UI objects are selected from the above two remocon application UIs and displayed as a single compound UI on the touch panel 200.

Since compounding UIs in such a manner enables to compose a compound UI by selecting UI objects frequently used or desired by the user to use, it is not necessary to reduce each UI object sacrificing its usability, that is, operability.

In addition, in spite of convenience enabling operations of a plurality of applications, the number of UI objects (soft keys such as buttons and the like) in the compound UI for each application is smaller than that in the stand-alone UI. Accordingly, it may spoil convenience for the user such as by not displaying the UI object corresponding to an operation desired by the user. For example, in comparison with the stand-alone UI in FIG. 12(a) and the compound UI in FIG. 12(b), UI objects corresponding to numerical keys of the TV remocon UI are not included in the compound UI. Therefore, the user cannot directly select each broadcast station with this compound UI.

Accordingly, an object of the present invention in consideration of such conditions is to provide a user interface generation apparatus capable of switching between a compound user interface and a stand-alone user interface by a simple operation.

Solution to Problem

In order to solve the above problems, a user interface generation apparatus according to a first aspect of the present invention includes:

a memory unit capable of storing an application program;

a control unit, based on the application program stored in the memory unit, for controlling, when receiving instruction to generate one user interface, to display a stand-alone user interface object group corresponding to the user interface of the instruction, and for controlling, when receiving instruction to generate a plurality of user interfaces, to display a compound user interface object group by performing compound processing on the user interface objects extracted from stand-alone user interface object groups corresponding to the plurality of user interfaces of the instruction, respectively;

a display unit for displaying the stand-alone user interface object group or the compound user interface object group; and an input unit, arranged at a front face of the display unit in relation to the display unit, for receiving a first input by a first input means and a second input by a second input means, wherein if the input unit receives the first input, the control unit executes a function of a user interface object corresponding to a reception position of the first input, and if the input unit receives the second input while the control unit controls to display the compound user interface object group, the control unit displays a stand-alone user interface object group of a user interface displayed correspondingly to a reception position of the second input in the compound user interface object group.

It is preferred that, when the control unit controls to display the stand-alone user interface object group of the user interface displayed correspondingly to the reception position of the second input in the compound user interface object group, and if the input unit further receives a second input, the control unit controls to display the compound user interface object group displayed before the stand-alone user interface object group.

It is preferred that, after the control unit controls to display the stand-alone user interface object group of the user interface displayed correspondingly to the reception position of the second input in the compound user interface object group, when the input unit receives a first input to a user interface object in the stand-alone user interface object group while a further second input is kept pressing down, and if the further second input is released, the control unit controls to display a compound user interface object group on which re-compound processing is performed with the user interface object corresponding to the first input and user interfaces included in the compound user interface object group displayed before the stand-alone user interface object group.

It is preferred that the control unit performs the re-compound processing by additionally displaying the user interface object corresponding to the first input to the compound user interface object group displayed before the stand-alone user interface object group.

It is preferred that the control unit performs the re-compound processing by replacing a user interface object with a low priority among user interface objects included in the compound user interface object group displayed before the stand-alone user interface object group with the user interface object corresponding to the first input.

Effect of the Invention

According to the present invention, the user can switch over between a compound user interface and a stand-alone user interface by a simple operation.

BRIEF DESCRIPTION OF DRAWINGS

FIG. 16 shows diagrams illustrating stand-alone user interfaces according to the first embodiment of the present invention;

FIG. 17 shows diagrams illustrating information indicating priority as user interface object definition information according to the first embodiment of the present invention;

FIG. 22 shows diagrams illustrating conventional remote controllers reproduced by the user interface of a mobile terminal;

DESCRIPTION OF EMBODIMENTS

Embodiments of the present invention will be described with reference to the accompanying drawings. In each of the embodiments described below, a mobile phone having remote control functions for remotely controlling various external apparatuses is used as an example of a user interface (hereinafter, referred to as "UP") generation apparatus according to the present invention. However, the UI generation apparatus according to the present invention is not limited to the mobile phone but may be applicable to any portable terminals such as, for example, a laptop computer, PDA and the like. In addition, the present invention is not limited to the mobile terminal but also applicable to apparatuses which need to implement it. It is to be noted that the present invention primarily intends to compound a plurality of UIs to be used simultaneously, and that an application instructed by each UI is not limited to one with a remote control function but the present invention may be applicable to various kinds of applications.

First Embodiment

Figure 13:
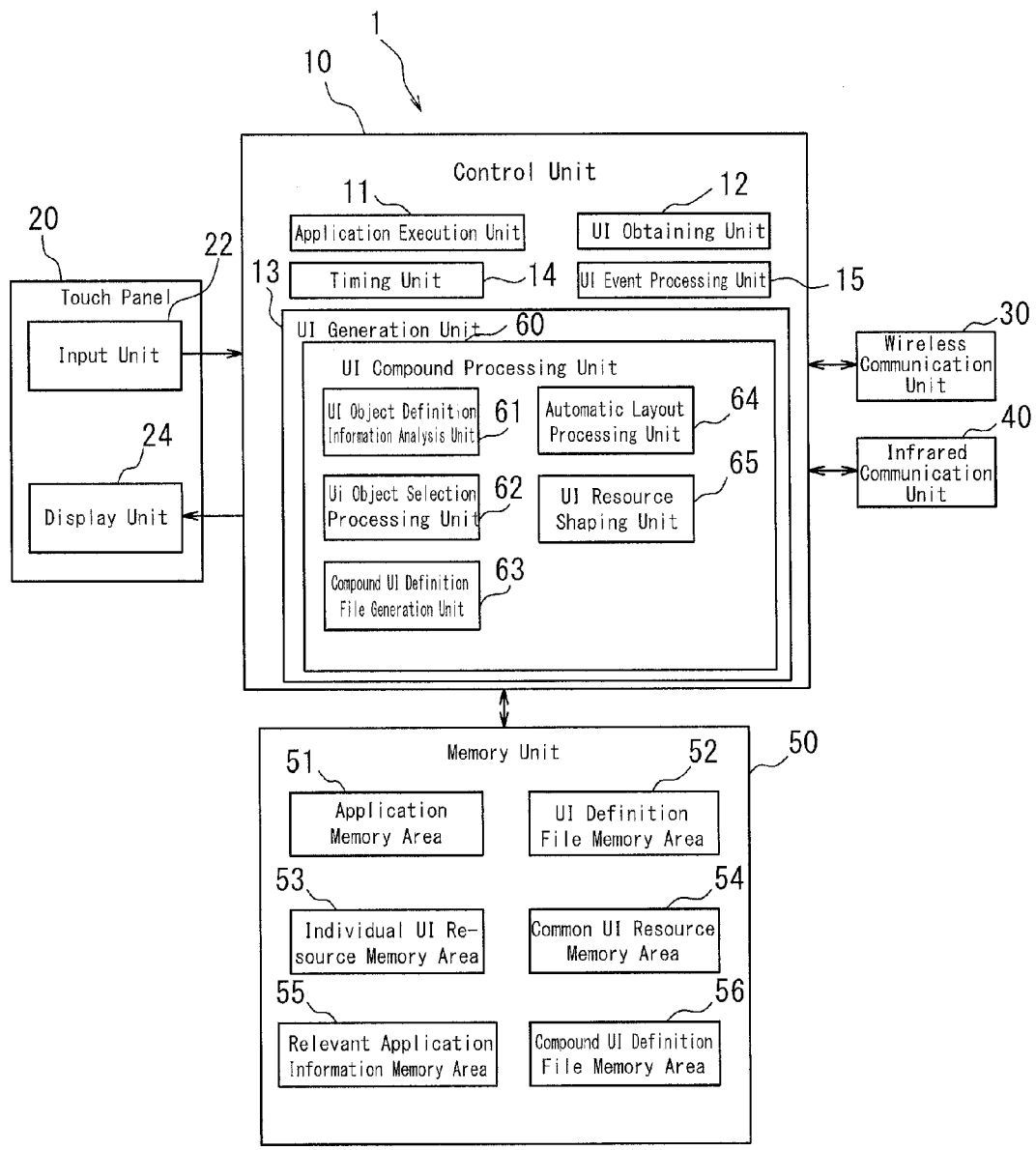
FIG. 13 is a block diagram illustrating a schematic configuration of a user interface generation apparatus according to a first embodiment of the present invention.

FIG. 13 is a block diagram illustrating a schematic configuration of a mobile phone, which is a UI generation apparatus according to a first embodiment of the present invention.

The mobile phone 1 includes a control unit 10 for controlling the overall operation and a touch panel 20 for receiving input by a user and for displaying a result of input and the like depending on each application. The touch panel 20 has an input unit 22 constituted of matrix switches and the like to receive input by the user and arranged at a front face of a display unit 24 constituted of a liquid crystal display and the like. The input unit 22 of the touch panel 20 detects contact by a user's finger or a pen-shaped input device such as a stylus and outputs a signal corresponding to input by such contact. The display unit 24 performs display according to an application program and also displays an image of UI, composed of UI objects such as various types of keys or buttons for receiving input by the user, in a predetermined UI display area. The UI display area means an area on the display unit 24 of the touch panel 20 for displaying the UI composed of UI objects.

In addition, the mobile phone 1 includes a wireless communication unit 30 for transmitting and receiving various information such as voice call, data of e-mail and the like to/from a base station (not shown) via the internet, by radio and the like, and an infrared communication unit 40 for communicating with various external equipments (not shown) by using infrared rays. The mobile phone 1 transmits and receives a variety of data to/from the external equipments by using the wireless communication unit 30 via the internet, a wireless link and the like.

Furthermore, the mobile phone 1 includes a memory unit 50 for storing input information and various applications and also for functioning as a work memory. The memory unit 50 includes an application memory area 51, a UI definition file memory area 52, an individual UI resource memory area 53, a common UI resource memory area 54, a relevant application information memory area 55, and a compound UI definition file memory area 56.

The control unit 10 includes an application execution unit 11, a UI obtaining unit 12, a UI generation unit 13, a timing unit 14 and a UI event processing unit 15.

The application execution unit 11 of the control unit 10 reads out and executes various applications stored in the application memory area 51 of the memory unit 50, as well as controlling such execution. In addition, the application execution unit 11, based on input to the UI corresponding to the application being read out from the application memory area 51 and executed, executes functions of the application corresponding to the input.

The UI obtaining unit 12 obtains resource (image data and the like) and a UI definition file (XML file and the like) from outside the terminal via the wireless communication unit 30. The UI generation unit 13 performs parsing and DOM (Document Object Model) processing on the UI definition file, and generates a UI to be used actually. The UI generation unit 13 interprets UI information, described in an XML form, by using an XML engine and displays the UI generated based on the UI definition file on the display unit 24 of the touch panel 20. The UI generation unit 13 performs various processing related to generation of various UIs including a compound UI. The UI generation unit 13 will be described in detail below.

In addition to measuring a length of time by using a counter, the timing unit 14 outputs a current time and notifies that a (preset) predetermined time has arrived. The UI event processing unit 15 processes an event to the UI generated by the UI generation unit 13, occurred based on an input to the input unit 22 and the like by a user's operation, and appropriately instructs the application execution unit 11 to execute a variety of functions.

The above UI generation unit 13 includes a UI compound processing unit 60, for performing compound processing of UIs based on a plurality of UI definition files. The UI compound processing unit 60 includes a UI object definition information analysis unit 61, a UI object selection processing unit 62, a compound UI definition file generation unit 63, an automatic layout processing unit 64 and a UI resource shaping unit 65.

The UI object definition information analysis unit 61 analyzes the UI object definition information defining various UI objects included in the UI definition file.

The UI object selection processing unit 62 performs processing to select a necessary UI object from numerous UI objects, either automatically or by input of the user. When selection is made by the user, the UI object selection processing unit 62 performs processing and control to generate a selection screen for receiving input to select a UI object by the user, by analyzing the UI object definition information defining the UI object to be displayed on the display unit 24.

The compound UI definition file generation unit 63 generates and outputs a UI, compounded by the UI compound processing unit 60, as a compound UI definition file.

The automatic layout processing unit 64 performs various controls and processing in relation to layout in compounding the UI. For example, the automatic layout processing unit 64 performs arrangement setting processing of each UI object, an arrangement availability determination processing, a reducing object selection processing, a minimum size setting processing and a margin setting processing. The following is a summarized description of those processing.

The arrangement setting processing of each UI object virtually arranges the UI object in accordance with a predetermined procedure, before the UI object is actually arranged in the predetermined UI display area. The arrangement availability determination processing determines whether the UI object virtually arranged by the arrangement setting processing can be arranged in the predetermined UI display area. If it is determined that not all of the UI objects can be arranged in the predetermined UI display area by the arrangement availability determination processing, the reducing object selection processing selects a UI object to be reduced, following a predetermined procedure. The minimum size setting processing sets a lowest limit of reducing for each UI object in accordance with the terminal-dependent information and the UI object definition information. The margin setting processing, in arranging a UI object, sets an adequate space (margin) around the UI object such that the UI object is not too close to another UI object or an edge of the UI display area.

The UI resource shaping unit 65 performs preview processing of selected UI objects and processing to expand or reduce data of resource used to compound the UIs, based on a display size of each UI object. In this case, the UI resource shaping unit 65 reads out and uses the data of the resource stored in the individual UI resource memory are 53 or the common UI resource memory area 54.

The application memory area 51 of the memory unit 50 stores a variety of applications constituted of data describing a procedure to implement various functions. The UI definition file memory area 52 stores the UI definition file defining a sequence of generation rules to generate each UI overall. The individual UI resource memory area 53 stores individual UI resource such as image data and character string (text) data used to generate UI unique to each application. The common UI resource memory area 54 stores common UI resource such as image data and font data commonly used by the UN used by the terminal, except for the individual UI resource unique to each application. When a UI is actually generated, the image data and the text data stored in the individual UI resource memory area 53 and the common UI resource memory area 54 are displayed on the display unit 24 of the touch panel 20.

In addition, the relevant application information memory area 55 stores relevant application information including activation information of an application relevant to the compound UI definition file (described below). The compound UI definition file memory are 56 stores the compound UI definition file generated by the compound UI definition file generation unit 63.

Next, the UI definition file stored in the UI definition file memory area 52 according to the present embodiment is described.

The UI definition file memory area 52 of the memory unit 50 stores the UI definition file defining a specification and an operation of an application of the UI necessary for execution of the application stored in the application memory area 51. Although the same UI may be used by different applications, here it is assumed that the UI used by each application differs from one another, for convenience of description, and that each UI definition file corresponding to each application is stored.

For example, a TV remocon UI definition file is stored in the UI definition file memory area 52, correspondingly to a TV remocon application for remotely controlling a TV set (not shown), which is an external equipment, by using the mobile phone 1. Similarly, an air conditioner remocon UI definition file is stored in the UI definition file memory area 52, correspondingly to an air conditioner remocon application for remotely controlling an air conditioner (not shown), which is another external equipment, by using the mobile phone 1.

According to the present embodiment, a UIML (User Interface Markup Language) form based on XML is used as an example of a language to describe the UI definition file. In order to activate and use a UI, in accordance with a definition described in the UIML form, the UI generation unit 13 displays the UI on the display unit 24 of the touch panel 20 of the mobile phone 1 and the application execution unit 11 executes processing in response to input to the input unit 22 by the user.

Figure 14:
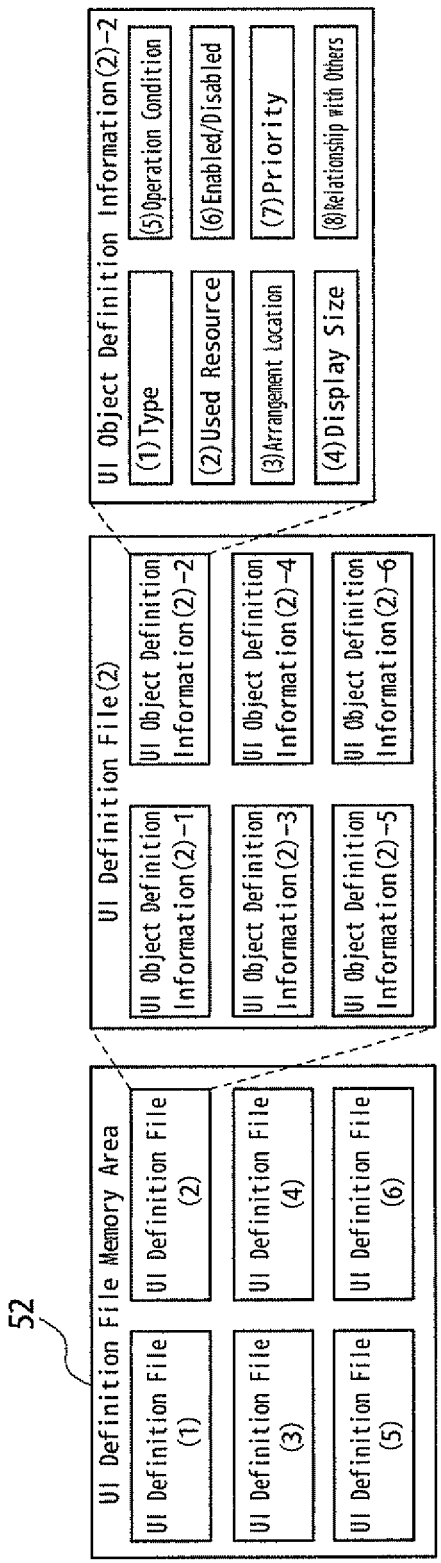
FIG. 14 is a conceptual diagram illustrating a structure of a user interface definition file of the present invention.

FIG. 14 is a conceptual diagram illustrating a structure of the UI definition file. As shown in FIG. 14, the UI definition file memory area 52 of the memory unit 50 of the mobile phone 1 stores the UI definition file defining a sequence of generation rules to generate an entire UI. Although six UI definition files (1) to (6) are stored in FIG. 14, the UI definition file memory area 52 may store any number of UI definition files in accordance with the UI to be used.

In addition, as shown in FIG. 14, each UI definition file includes a plurality of UI object definition information. Although the UI definition file (2) includes six UI object definition information ((2)-1 to (2)-6) in FIG. 14, the UI definition file (2) includes the UI object definition information as many as the UI objects included in the UI to be composed based on the UI definition file (2), in practice.

Each UI object definition information included in the UI definition file includes information indicating various attributes in relation to the UI object defined by the UI object definition information, as shown in the figure. The followings are examples of representative information included in the UI object definition information:

(1) type information of a component (UI object): information specifying a type, such as whether the UI object has a function of a button or key to receive operations by the user, a text box function to display information, or function to simply display an image on the display unit 24;
(2) resource information used for the UI object: information defining image and text for displaying the UI object such as a key or button, a component of the UI to be displayed on the display unit 24;
(3) location information for arranging the UI object: information specifying where to display the UI object in a predetermined UI display area;
(4) display size information of the UI object: information specifying a size of the UI object when displayed in the UI display area;
(5) operational condition information of the UI object (action information): information specifying an operation to an application when there is input to the UI object (when there is input to a portion of the input unit 22 corresponding to the UI object, in practice) (for example, information defining to instruct the TV remocon application, if an input event is occurred to a UI object of "Power" of a TV remocon UI, to transmit an infrared signal to turn on or off the power of the TV as the external equipment);
(6) information to enable or disable the UI object: information specifying whether to display the UI object in the UI display area or whether to activate the UI object;
(7) priority order information of the UI object: information on priority of the UI object, when a plurality of UIs are compounded, based on a relationship between the UI object and other UI objects; and
(8) relationship information between the UI object and another UI object: information, when the UI object has a predetermined relationship with another UI object, specifying the relationship.

Although a variety of information may be considered as the operational condition information of the UI object (action information) of the above (5), the followings are main three types, including the information stated above, defined as types of the action information according to the present embodiment.
1. Action for changing property (attribute information) of the UI object
2. Action for carrying out function of application
3. Action for activating stand-alone UI In addition, the mobile phone 1 according to the present embodiment can select and adopt a plurality of UI objects from a plurality of UIs based on selecting operations by the user and display the plurality of UI objects as the compound UI in one UI display area. In this case, although each UI has a corresponding UI definition file, the compound UI composed of the UI objects selected by the user as desired has no corresponding UI definition file originally. Therefore, in generating the compound UI composed of the UI objects selected by the user, the UI compound processing unit 60 generates and stores a compound UI definition file based on the compound UI. The following is a further description of operations to generate the compound UI definition file.

Figure 15:
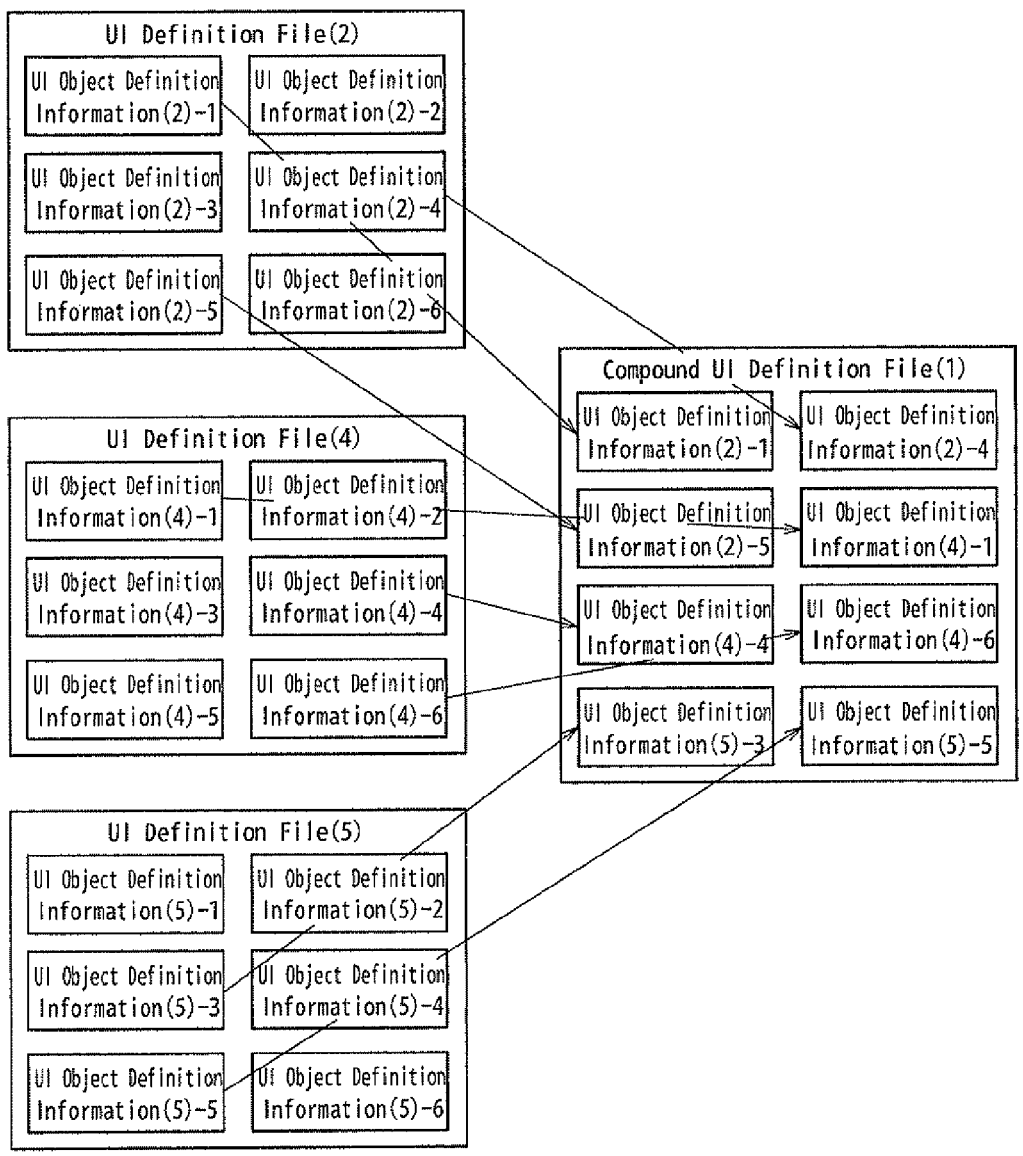
FIG. 15 is a conceptual diagram illustrating a structure of a compound user interface definition file of the present invention.

FIG. 15 is a conceptual diagram illustrating a structure of the compound UI definition file. The compound UI definition file is a single UI definition file having extracted parts of the UI object definition information included in the plurality of UI definition files, collectively. The UI object definition information to be included in the compound UI definition file may be processed in a variety of manners as necessary when extracted from the stand-alone UI to which it originally belongs and compounded.

For example, information for identifying definition of the compound UI and information for designating relevant application information are added. An example shown in FIG. 15 illustrates a conceptual diagram of generation of a new compound UI definition file (1) by gathering some extracted UI object definition information from each of three UI definition files (2), (4) and (5). In this manner, the UI compound processing unit 60 processes as necessary before compounding, when extracting some UI object definition information from each UI object definition file and collecting them in the compound UI definition file.

In compounding a plurality of UIs, the UI object selection processing unit 62 of the UI compound processing unit 60 generates a UI object selection screen based on each UI definition file and extracts the UI object definition information of the UI objects selected by the user. The UI compound processing unit 60 collects the UI object definition information extracted in this manner. At this time, the compound UI definition file generation unit 63 generates a single compound UI definition file from the UI object definition information collected. From a point of the user, this is generation of a single compound UI by selecting and adopting some UI objects from the plurality of UIs. As set forth above, when the compound UI definition file generation unit 63 generates the compound UI definition file, the UI compound processing unit 60 processes the UI object definition information as necessary. Then, the UI compound processing unit 60 stores the compound UI definition file generated by the compound UI definition file generation unit 63 in the compound UI definition file memory area 56.

The following is a description of the UI generated based on the UI definition file, by using a specific example. FIGS. 16(A) and (B) are diagrams illustrating remocon application UIs as examples of the stand-alone UI (stand-alone user interface object group) generated based on each UI definition file as shown in FIG. 14 and FIG. 15. FIG. 16(A) shows an example of the remocon application UI (user interface object group) of the TV set, whereas FIG. 16(B) shows an example of the remocon application UI (user interface object group) of the air conditioner. If the UI definition file is described in a file format of UIML based on XML and a UI is generated by analyzing such UIML files, the UI for a single screen is generated to fit in the predetermined UI display area of the display unit 24. In the UI definition file of each UI, various attributes are defined for UI objects composing each UI by the UI object definition information.

The UI object selection processing unit 62 selects some UI objects from the stand-alone UIs (stand-alone user interface object group) shown in FIGS. 16(A) and (B) based on a predetermined standard. The UI compound processing unit 60 performs the aforementioned processing to generate the compound UI with these UI objects. Thereby, the compound UI definition file generation unit 63 can generate the compound UI definition file constituting one compound UI by selecting and adopting the plurality of UI objects.

According to the present embodiment, in generation of the compound UI by compounding a plurality of UIs, it is also possible to automatically select main UI objects among the UI objects. In this case, when the UI object selection processing unit 62 automatically selects the UI objects, the (7) priority order information of the UI object described above is used.

FIG. 17 is a diagram illustrating the priority order information of the UI object according to the present embodiment.

FIG. 17(A) shows that only the TV remocon application is activated in the mobile phone 1 and, based on the TV remocon UI definition file, the TV remocon UI as the stand-alone UI is displayed on the touch panel 20. In the figure, the UI display area on the touch panel 20 is conceptually divided by dashed lines into small areas corresponding to the attribute information of respective UI objects. In addition, since a definition (UI identification information) to collectively handle a plurality of UI objects as one UI (use interface object group) is shown with a tag of interface, it is possible to identify it as the UI of the remocon of TV1 from a value of the tag of "TV_interface". Exemplary UI object attribute information corresponding to respective small areas (1)-(7) shown in FIG. 17(A) is shown below.

Interface id="TV1_interface"
(1) ID="switch1" priority="0"
(2) ID="ch_select" priority="1"
(3) ID="volume" priority="1"
(4) ID="10key" priority="4"
(5) ID="timer" priority="3"
(6) ID="bilingual" priority="3"
(7) ID="title" priority="0"

According to the present embodiment, in the UI object attribute information, priority of the UI object of each of the small areas (1)-(7) stated above is defined as a value of priority in advance. In the example shown in FIG. 17, the UI object with the priority value 0 is an essential (always selected) object, and the UI object with the priority value 1 is an important object. As the value of the priority increases, the UI object is less prioritized. That is, for example, since a "Power" key shown in the small area (1) in FIG. 17(A) is the essential object, its priority value is set to 0. Channel selection keys in the small area (2) and volume up and down keys in the small area (3) are important keys, and thus their priority values are set to 1. However, since the numerical keypad in the small area (4) may be substituted by the channel selection keys in the small area (2) and (3), its priority value is set to 4 to have a low priority. In addition, a timer key in the small area (5) and a bilingual key in the small area (6) do not have high priorities, and thus their priority values are set to 3.

In addition, a character string in the small area (7) is not a key for receiving an input by the user but a UI object showing a name of the TV remocon UI. Although a name of a UI like this is not inevitable in using the stand-alone UI, it improves visibility in generating the compound UI, and therefore it is defined as an essential UI object to be displayed in the present example.

FIG. 17(B) shows that only the air conditioner remocon UI as the stand-alone UI is displayed on the touch panel 20. Exemplary UI object attribute information corresponding to the small areas (1)-(7) of FIG. 17(B) is shown below. A value of the tag of interface is set to "AIR1_interface", such that it is identified as a single UI of the remocon of air conditioner 1 in which the plurality of objects are arranged.

Interface id="AIR1_interface"
(1) ID="switch2" priority="0"
(2) ID="set window" priority="0"
(3) ID="temp" priority="1"
(4) ID="wind_velo" priority="1"
(5) ID="direction" priority="2"
(6) ID="mode" priority="3"
(7) ID="title" priority="0"

In the air conditioner remocon UI, since, for example, a "Power" key shown in the small area (1) is an essential key and a "Setting Temperature" shown in the small are (2) is essential, their priority values are set to 0. In addition, since temperature up and down adjustment keys in the small area (3) and wind velocity adjustment keys in the small area (4) are important, their priority values are set to 1. With a lower priority in comparison to those keys, a priority value of wind direction keys in the small area (5) is set to 2, and a priority value of a mode key in the small area (6) is set to 3. A character string in the small area (7) is not a key for receiving an input by the user but a UI object showing a name of the air conditioner remocon UI, and therefore it is defined as an essential UI object to be displayed in the present example.

As set forth above, according to the present embodiment, priority information (priority value) defined based on the relationship between each UI object and other UI objects is stored as the UI object attribute information in the UI object definition information of each UI definition file. The priority information is used as information for determining whether to adopt each UI object to the compound UI when the UI generation unit 13 performs an automatic selection processing of UI objects in the UI compound processing. Since the UI display area on the display unit 24 is limited, the UI objects with low priorities are not adopted in generating the compound UI. Instead, the UI objects with high priorities originally included in other UIs are adapted to the compound UI.

Next, operations to compound UIs of a plurality of applications according to the present embodiment is described with reference to flowcharts shown in FIG. 18 to FIG. 20.

Figure 18:
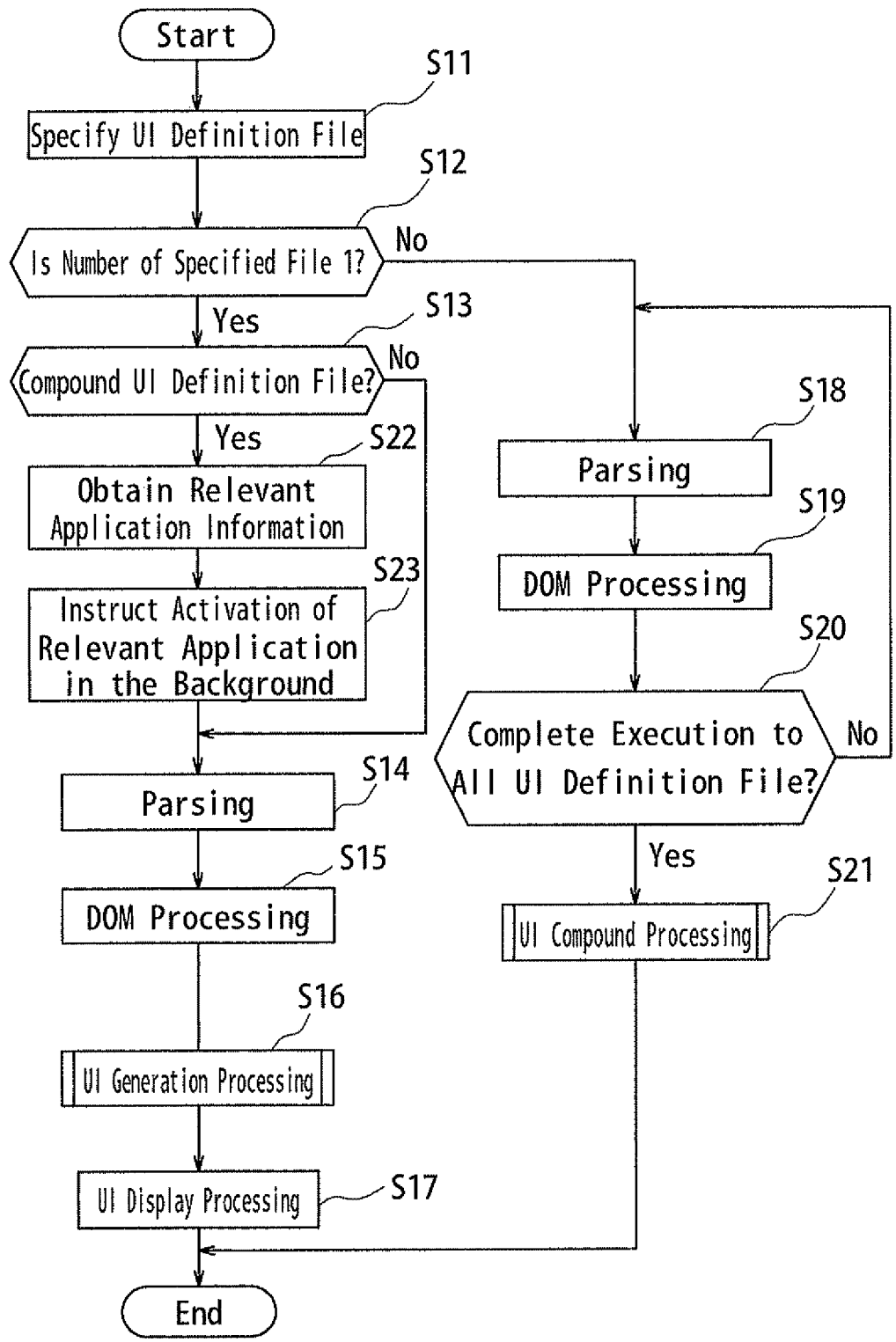
FIG. 18 is a flowchart illustrating overall user interface generation processing according to the first embodiment of the present invention.

FIG. 18 is a flowchart illustrating overall processing by the UI generation unit 13 to generate and enable a UI from the UI definition file or the compound UI definition file, according to the present embodiment. First, when an application is activated based on operative input to the input unit 22 and the like by the user and the application execution unit 11 instructs to generate the UI of the application, processing to generate and enable the UI is started. Upon start of this processing, an application authorized to display the UI specifies the UI definition file (XML file) (Step S11). Such application authorized to display the UI is operated not in the background of the mobile phone 1 but at the top of the application. A trigger to start this processing may be an operation by the user for activating an application using a UI, an operation by the user for activating an application using a UI during execution of another application, and the like.

Next, the UI generation unit 13 determines whether the number of UI definition files specified at step S11 is one or more (step S12). If it is determined that the number of files specified is one, the UI generation unit 13 determines that the application which has instructed is not requiring compound of a plurality of UIs and shifts to step S13. At step S13, the UI generation unit 13 retrieves the specified UI definition file from the UI definition file memory area 52 or the compound UI definition tile memory area 56, and determines whether the UI definition file is a compound UI definition file.

At step S13, if it is determined that the specified file is not the compound UI definition file, that is, the specified file is the UI definition file of the stand-alone UI retrieved from the UI definition file memory area 52, the processing shifts to step S14.

At step S14, after performing XML parsing on the specified UI definition file of the stand-alone UI, the UI generation unit 13 performs DOM processing (step S15). Like this case, if a single UI definition file is specified and it is a UI definition file of stand-alone UI, processing thereafter is the same as a conventional UI generating processing. That is, based on the UI definition file after the parsing and the DOM processing being performed thereon, the UI generation unit 13 performs a UI generation processing (step S16). The UI generation processing at step S16 will be described below. Next, based on the UI of the XML file generated by the UI generation processing, the UI generation unit 13 performs processing to display the UI in the UI display area of the display unit 24 of the touch panel 20 (step S17). Thereby, the stand-alone UI can be used on the mobile phone 1.

On the other hand, if the number of files specified at step S11 is more than 1, the UI generation unit 13 determines that the application is requiring compound of a plurality of UIs and performs the XML parsing (step S18) and the DOM processing (step S19) on each of the XML files. At step S20, the UI generation unit 13 determines whether it is completed to perform the above parsing and the DOM processing on all of the UI definition files. If it is not completed, the processing returns to step S18 to perform the parsing and the DOM processing on remaining UI definition files.

If it is determined at step S20 that it is completed to perform the parsing and the DOM processing on all of the UI definition files, the UI compound processing unit 60 compounds the plurality of UIs to which the parsing and the DOM processing are completed (step S21). That is, the UI generation unit 13 instructs to generate (compound) the plurality of UIs. The UI compound processing at step S21 will also be described below.

When the UI compound processing is performed at step S21, the compound UI definition file generation unit 63 generates the compound UI definition file of the compound UI. Although overall processing ends thereafter, the compound UI definition file is specified at step S11 if the processing resumes by using the compound UI definition file generated here. Accordingly, it is determined that one file is specified at step S12 and that the compound UI definition file is specified at step S13.

If it is determined at step 13 that one specified file is the compound UI definition file, the processing shifts to step S22. If the specified file is the compound UI definition file and the compound UI generated (prepared) as the compound UI definition file is activated for actual use, it is necessary to display UI objects as one compound UI (compound user interface object group) on the display unit 24 to make them usable. Therefore, the UI generation unit 13 obtains the relevant application information, stored in association with a target compound UI definition file, from the relevant application information memory area 55 of the memory unit 50 (step S22). Next, based on the relevant application information obtained, the UI generation unit 13 instructs the application execution unit 11 to activate a relevant application in the background (step S23).

After that, the processing shifts to step S14 and the processing thereafter is the same as that for the UI definition file of the stand-alone UI. That is, the UI generation unit 13 performs the XML parsing (step S14) and the DOM processing (step S15) on the specified UI definition file of the compound UI. Moreover, based on the specified compound UI definition file, the UI generation unit 13 performs a compound UI generation processing (step S16). Then, the UI generation unit 13 performs processing to display the compound UI generated in the UI display area of the display unit 24 of the touch panel 20 (step S17) and ends overall compound UI generation processing.

Next, the UI generation processing at step S16 in FIG. 18 is further described with reference to a flowchart shown in FIG. 19. The UI generation processing at step S16 is a narrowly-defined UI generation processing, that is, processing to analyze the UI definition file and to enable the UI to be displayed on the display unit 24 based on a result of such analysis.

Figure 19:
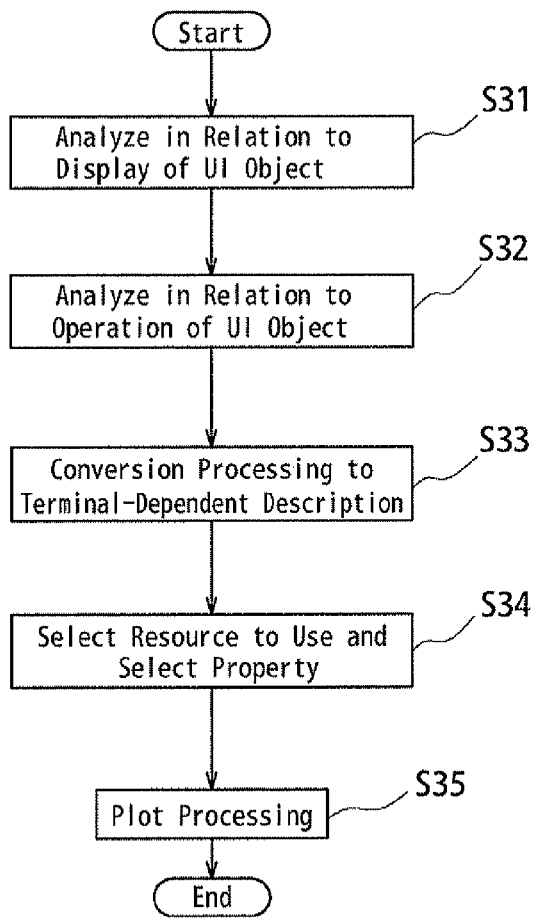
FIG. 19 is a flowchart illustrating user interface generation processing according to the first embodiment of the present invention.

At start of the UI generation processing shown in FIG. 19, either the stand-alone UI or the compound UI based on the specified UI definition file is formed as a single DOM document (or DOM node). First, the UI generation unit 13 performs analysis in relation to display of the DOM document (step S31). For the UI definition file described in the UIML form, attributes with structure tag or style tag are analyzed, Next, the UI generation unit 13 performs analysis in relation to operation of the DOM document (step S32). For the UI definition file described in the UIML form, attribute with behavior tag and the like are analyzed.

Next, the UI generation unit 13 performs conversion processing of an expression included in the DOM document into a description dependent on each terminal (step S33). Moreover, the UI generation unit 13 selects a resource of the UI object to be used based on a result of the conversion processing at step S33 and sets each attribute (property) (step S34). The resource of the UI object necessary at this time is stored as the individual UI resource in the individual UI resource memory area 56 or as the common UI resource in the common UI resource memory area 58. Subsequently, the UI generation unit 13 performs plot processing of the UI including each UI object (step S35). Thereby, the UI generation processing ends and the UI generation unit 13 shifts to step S17 in FIG. 18 for UI display processing.

Accordingly, the mobile phone 1 can display the stand-alone UI on the display unit 24 based on the UI definition file of the stand-alone UI, while executing the application using the stand-alone UI. For example, if the UI definition file of the TV remocon is specified by the application of the TV remocon, the UI is displayed as shown in FIG. 16(A) described above. If the UI definition file of the air conditioner remocon UI is specified by the application of the air conditioner remocon, the UI is displayed as shown in FIG. 16(B). It is also possible to display the compound UI on the display unit 24 based on the compound UI definition file in accordance with execution of the application using the compound UI.

Next, the UI compound processing at step S21 shown in FIG. 18, that is, processing performed when it is instructed to generate a plurality of UIs further described with reference to a flowchart shown in FIG. 20.

Figure 20:
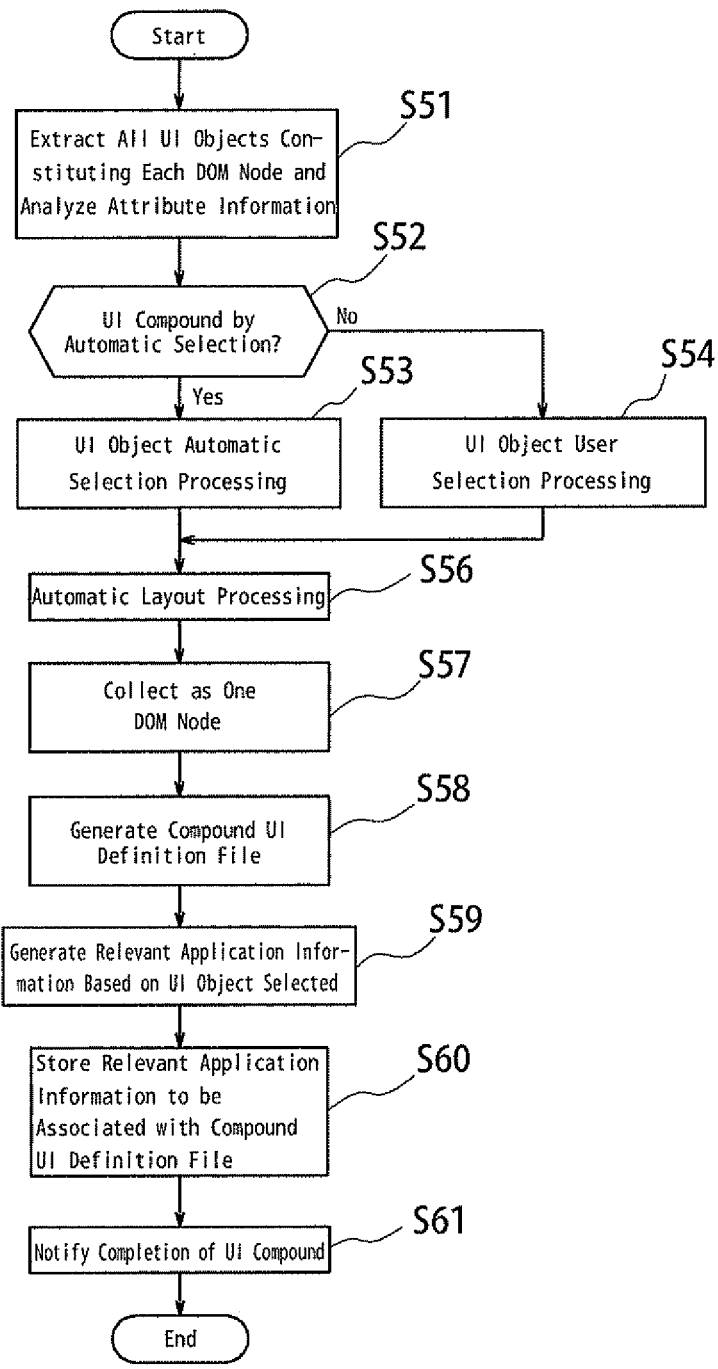
FIG. 20 is a flowchart illustrating user interface compound processing according to the first embodiment of the present invention.

Upon start of the UI compound processing shown in FIG. 20, the UI compound processing unit 60 extracts all of the UI objects constituting each DOM node of the plurality of UIs to which the parsing and the DOM processing are completed and analyzes the attribute information of each of the UI objects (step S51). As shown in FIG. 14, there are many attribute information of each UI object that should be analyzed, including the priority information (priority) of each UI object.

After analyzing the attribute information of the all of the UI objects, the UI compound processing unit 60 determines whether automatic selection is instructed for selection (extraction) of UI objects, among the UI objects extracted, to be adopted to the compound UI (step S52).

If it is instructed to compound UIs by automatic selection at step S52, the UI object selection processing unit 62 performs UI object automatic selection processing (step S53). Thereby, UI objects to be adopted as the UI objects composing the compound UI are automatically extracted. In the UI object automatic selection processing, the UI object selection processing unit 62 automatically selects (extracts) the UI objects based on a predetermined rule such as, for example, adopting UI objects with values of priority 0-2, as the priority information of the attribute information analyzed for each UI object to the compound UI.

In contrast, if it is not instructed to compound UIs by automatic selection at step S52, the UI object selection processing unit 62 performs selection processing of the UI objects by the user (step S54). Thereby, UI objects to be adopted as the UI objects composing the compound UI are extracted based on selection by the user. In the selection processing of the UI objects by the user, the UI objects selected by the user based on input operation by the user are adopted to the compound UI (extracted as objects to be adopted). In this case, it is preferred that the UI object selection processing unit 14, on the UI object selection screen, calculates a total occupancy of the UI objects selected in the UI display area, in order to prevent selection (extraction) of UI objects that cannot fit in the UI display area.

After selection (extraction) of all of the UI objects to be adopted to the compound UI, the automatic layout processing unit 64 performs processing to virtually arranging the UI objects selected (extracted) in the UI display area (step S56). At this time, the UI resource shaping unit 65 adjusts the display size of the UI object selected, as necessary. In addition, the automatic layout processing unit 64 sets an adequate space (margin) around the UI object, such that the UI object is not too close to another UI object.

Upon completion of arranging processing of the UI objects selected, the UI compound processing unit 60 collects the UI objects in a confirmed layout as a single DOM node (step S57). Next, the compound UI definition file generation unit 63 generates the compound UI definition file defining the compound UI composed of the UI objects selected, based on the UI object definition information of the UI objects selected (step S58). The compound UI definition file thereby generated is stored as one file in the XML form in the compound UI definition file memory area 56 of the memory 50.

After generation of the compound UI definition file at step S58, the UI compound processing unit 60 generates relevant application information based on the UI objects selected (extracted) for the compound UI (step S59). The relevant application information generated here is information, if there is an input by the user to each UI object selected (extracted) for the compound UI, for controlling an application related to the UI object. After generation of the relevant application information based on the UI objects selected, the compound UI definition file generation unit 63 of the UI compound processing unit 60 associates the relevant application information with the compound UI definition file and the stores the information in the relevant application information memory area 55 (step S60). After that, the UI compound processing unit 60 notifies the application execution unit 11 of completion of the UI compound processing (step S61) and ends the UI compound processing.

Accordingly, it is possible to immediately display the compound UI (compound user interface object group) generated on the display unit 24. In addition, it is also possible to retrieve and use the compound UI definition file stored in the compound UI definition file memory area 55 later, without immediately using the compound UI generated.

Through the overall UI generation processing described with reference to FIG. 18 after the UI compound processing stated above, the compound UI is generated with the UI objects selected (extracted) from the stand-alone UIs. For example, it is possible to generate the compound UI (compound user interface object group) shown in FIG. 21 by using the UI objects selected from the remocon application UI of the TV set shown in FIG. 16(A) and the remocon application UI of the air conditioner shown in FIG. 16(B).

Figure 21:
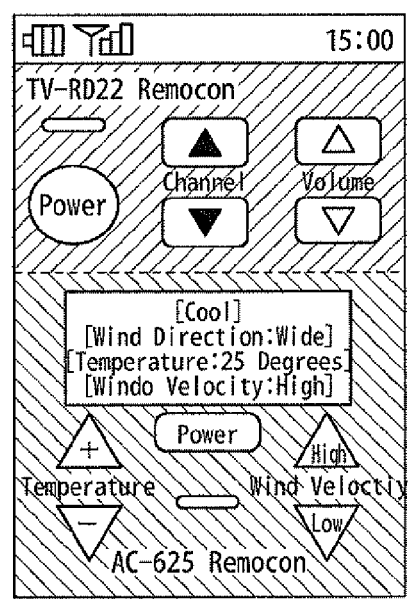
FIG. 21 is a diagram illustrating an exemplary compound of two stand-alone user interfaces by the user interface compound processing according to the first embodiment of the present invention.
Figure 23:
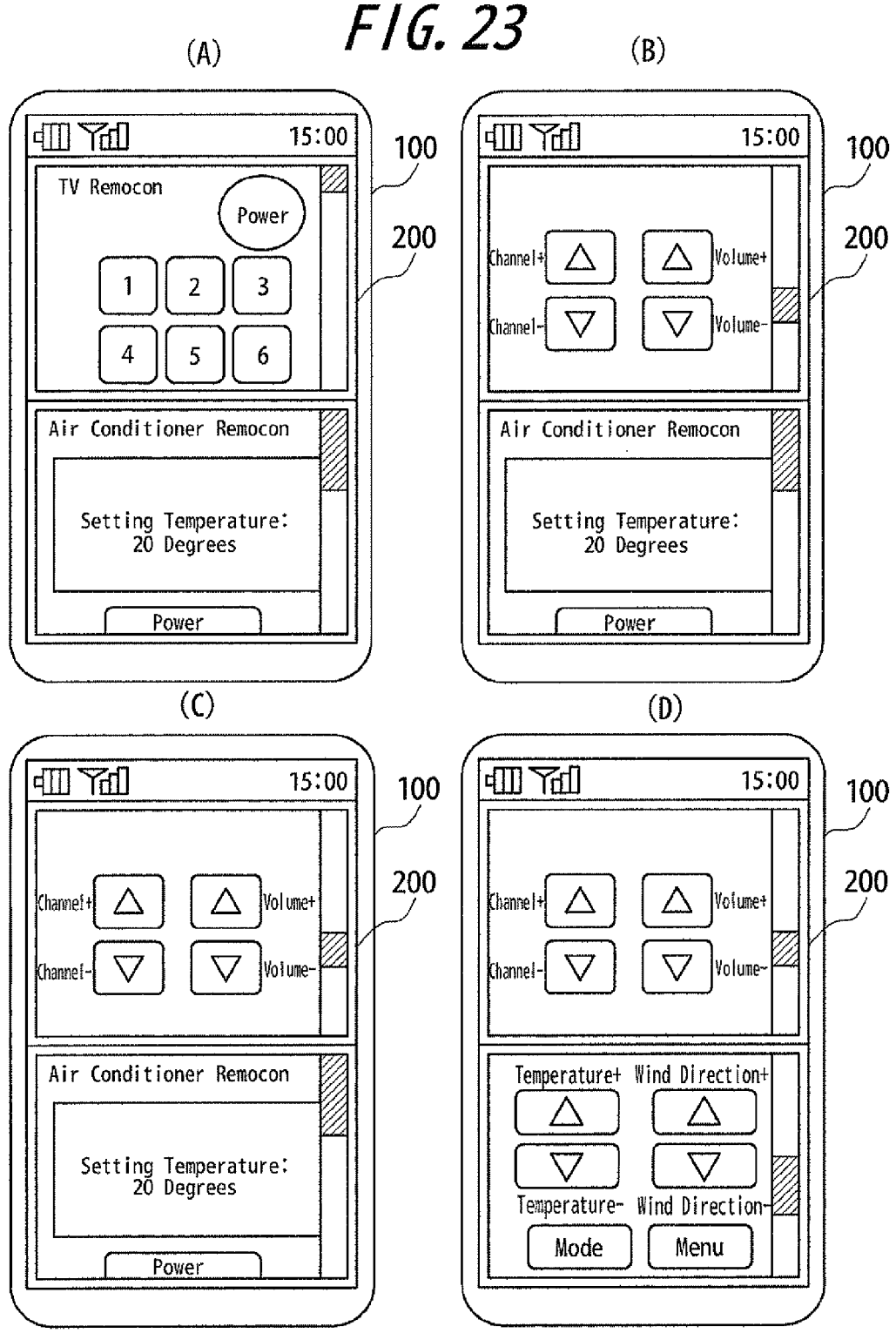
FIG. 23 shows diagrams illustrating examples of conventional compound of two user interfaces by the mobile terminal.
Figure 24:
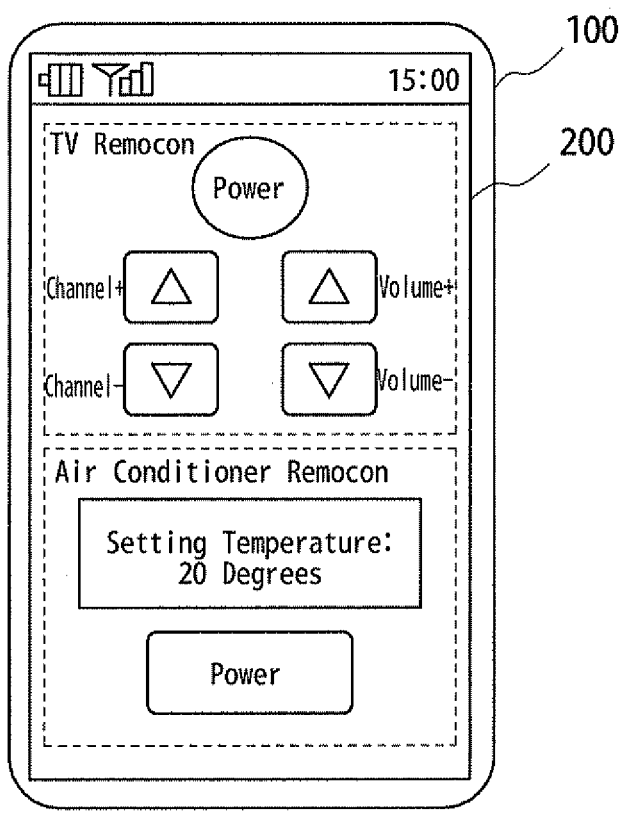
FIG. 24 is a diagram illustrating an exemplary compound of two stand-alone user interfaces by the mobile terminal.

FIG. 21 shows an exemplary compound UI (compound user interface object group) generated by automatic selection of UI objects by the UI object selection processing unit 62 based on the standard to adopt UI objects of each UI with priority values (priority) 0-2 of the UI object attribute information. In the compound UI shown in FIG. 21, the UI display area of the touch panel 20 is divided into two areas: an upper area for arranging the UI objects selected from the TV remocon UI and a lower area for arranging the UI objects selected from the air conditioner remocon UI.

According to the present embodiment, as stated above, a plurality of UIs are compounded by analyzing two XML files, extracting the UI objects with high priorities and automatically arranging them. Thereby, the user can use the plurality of UIs as one compound UI without switching among plurality of applications or UIs based on the applications.

Second Embodiment

Figure 1:
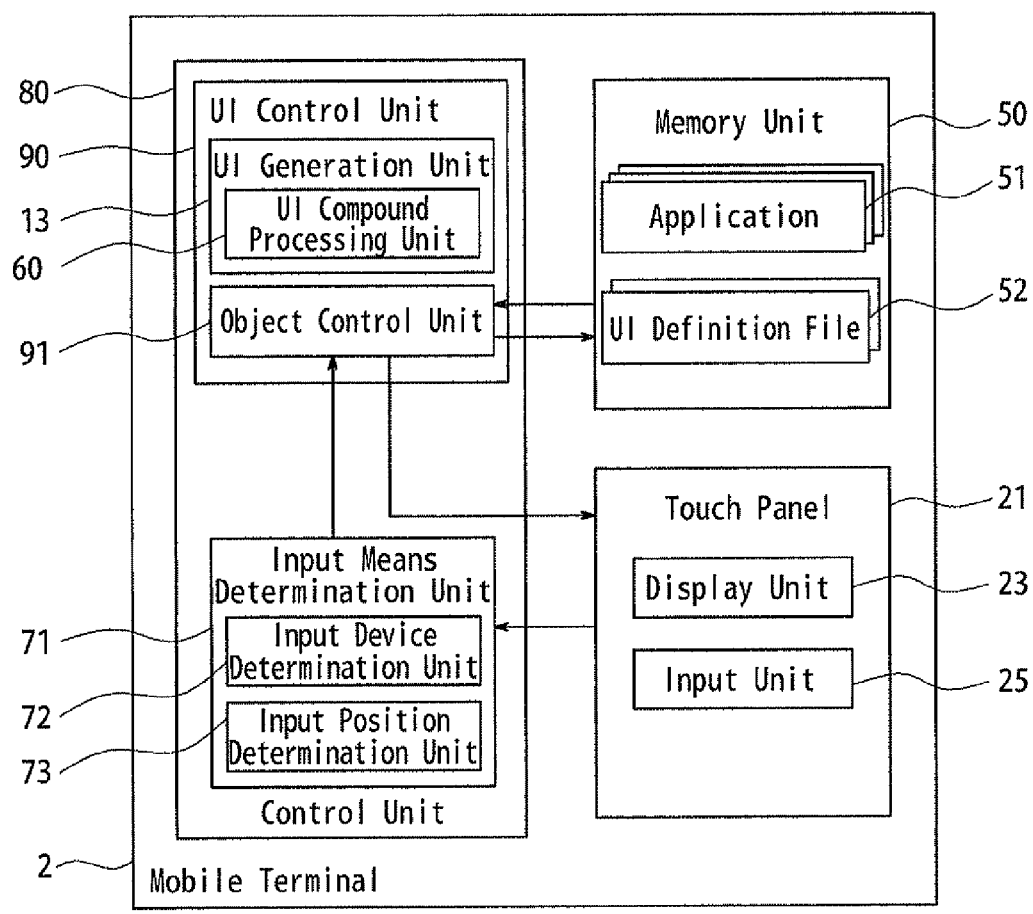
FIG. 1 is a diagram illustrating a constitution of a mobile terminal according to a second embodiment of the present invention.

FIG. 1 is a block diagram illustrating a schematic configuration of a mobile terminal which is a UI generation apparatus according to a second embodiment of the present invention.

A mobile terminal 2 shown in FIG. 1 is a mobile communication terminal such as a PDA (Personal Digital Assistance), for example, and has a touch panel 21, a control unit 80 and a memory unit 50. The touch panel 21 has a function as the display unit 23 for displaying a UI including soft keys such as buttons and the like (UI objects) and a function as the input unit 25 for sensing an input to the soft keys (UI objects) with a finger, a pen and the like. The touch panel 21 may be a touch panel of a surface elastic type, an image sensor panel in which an image sensor function is integrally joined to a liquid crystal display, or any other suitable touch panel. The control unit 80 has an input means determination unit 71 and a UI control unit 90 in a part for operations in conjunction with the touch panel 21 according to a program stored in the memory unit 50. The control unit 80 may be any suitable processor such as, for example, a CPU (Central Processing Unit) and the like, and each function of the control unit 80 may be constituted of a software executed on the processor or an exclusive processor (for example, DSP (Digital Signal Processor)) specialized for processing of each function. The input means determination unit 71 has an input device determination unit 72 for determining a type of the input device and an input position determination unit 73 for determining an input position. The UI control unit 90 has the UI generation unit 13 and an object control unit 91, and the UI generation unit 13 includes the UI compound processing unit 60 in the same manner as that in FIG. 13. Since functions of the UI generation unit 13 and the UI compound processing unit 60 are the same as those in FIG. 13, detailed descriptions thereof are omitted. The object control unit 91 obtains action information (application) associated with the soft keys (UI objects) received the input from the memory unit 50 and executes a function (action) of the UI object in accordance with the application program. The memory unit 50, in the same manner as that in FIG. 13, has the application memory area 51, the UI definition file memory area 52, the individual UI resource memory area (not shown), the common UI resource memory are (not shown), the relevant application information memory area (not shown) and the compound UI definition file memory area (not shown) and may be, for example, a volatile memory (SRAM and the like), a nonvolatile memory (EEPROM and the like), or any other suitable memory medium. Contents of storage in each memory area of the memory unit 50 are the same as those in FIG. 13, and thus detailed descriptions thereof are omitted.

A user interface of either the stand-alone UI or the compound UI is displayed on the touch panel 21 by the control unit 90. The UI generation unit 13 of the UI control unit 90 refers to the UI definition file memory unit 52 of the memory unit 50 and obtains the UI definition file necessary to generate the UI. The UI generation unit 13 generates the UI by performing the parsing and the DOM (Document Object Model) processing and the like on the UI definition file described in the XML form, and the UI control unit 90 displays the UI generated on the touch panel 21. In displaying the compound UI on the touch panel 21, the UI compound processing unit 60 of the UI control unit 90 analyzes the UI object definition information defining a variety of UI objects included in the UI definition file. Subsequently, the UI compound processing unit 60 generates the compound UI by performing processing to select necessary UI objects among a number of UI objects by either automatic selection or the input by the user (for example, in consideration of layout information (information on the display position and the display size of the UI object), the priority orders and the like of each UI object).

When the user performs the input operation to a UI object displayed on the touch panel 21, the input device determination unit 71 obtains information on a device (input means such as the pen, the finger or the like) of the user input from the input device determination unit 71 and information on a position (a coordinate on the touch panel) from the input position determination unit 73.

The input device determination unit 72 can detect the input to the touch panel 21 and determine the input device (means) by calculating a contact area of the input. For example, in using the touch panel 21 of the surface elastic type, a signal value changes as much as absorption of a surface elastic wave by the input, thus the input device determination unit 72 can calculate the contact area by integrating a time of such change. For example, the input device determination unit 72 determines that a pen is used for the input if the contact area on the touch panel 21 is smaller than a predetermined value, while determining that the finger is used for the input if the contact area on the touch panel 21 is equal to or over the predetermined value.

In addition, it is also possible to use the image sensor as the input device determination unit 72. For example, in using an image panel in which the image sensor function is integrally joined to the liquid crystal display as the touch panel 21, an amount of received light by each pixel is converted into charge when an input device (input means) such as the finger or the pen touches a surface of the image panel, thereby it can reproduce an image of an object by reading the pixels in an entire area. Accordingly, the input device determination unit 72 can determine the input device based on a characteristic part of the image of the object. It is also possible to use a camera in place of the image sensor for determination of the input device to perform the input operation to the touch panel 21.

When the input to the touch panel 21 is detected, the input position determination unit 73 determines the input position. In using the touch panel 21 of the surface elastic type, for example, the input position determination unit 73 can determine the input position by measuring a time from giving an oscillation to returning of the oscillation reflected. In addition, in using the image panel in which the image sensor function is integrally joined to the liquid crystal display as the touch panel 21, for example, the input position determination unit 73 can determine the input position based on a display position of the characteristic part of the image of the object.

If there are simultaneous inputs at a plurality of positions on the touch panel 21, the input device determination unit 72 determines respective input devices and the input position determination unit 73 determines respective input positions, for the inputs.

The object control unit 91 executes a function associated with the UI object displayed at the input position of the touch panel 21 according to the input position determined by the input position determination unit 73. For example, the object control unit 91 switches between ON and OFF of power in response to an input to a "Power key" or selects a channel of a predetermined program in response to an input to a "numerical key". In addition, the object control unit 91 can switch a function of the UI object based on the input device determined by the input device determination unit 72. For example, if an input to the touch panel 21 is detected and the input device determination unit 72 determines that it is a main input by a first input means (for example, an input by the pen), the object control unit 91 executes a normal function of the UI object at the input position. If the input device determination unit 72 determines that the input to the touch panel 21 is a sub input by a second input means (for example, an input by the finger), the object control unit 91 may execute another function different from the normal function. Moreover, the object control unit 91 can switch the function of the UI object based on the input number. For example, if the input number to the touch panel 21 is one, the normal function of the UI object at the input position is executed, whereas another function different from the normal function is executed if the input number to the touch panel 21 is more than one.

Figure 2:
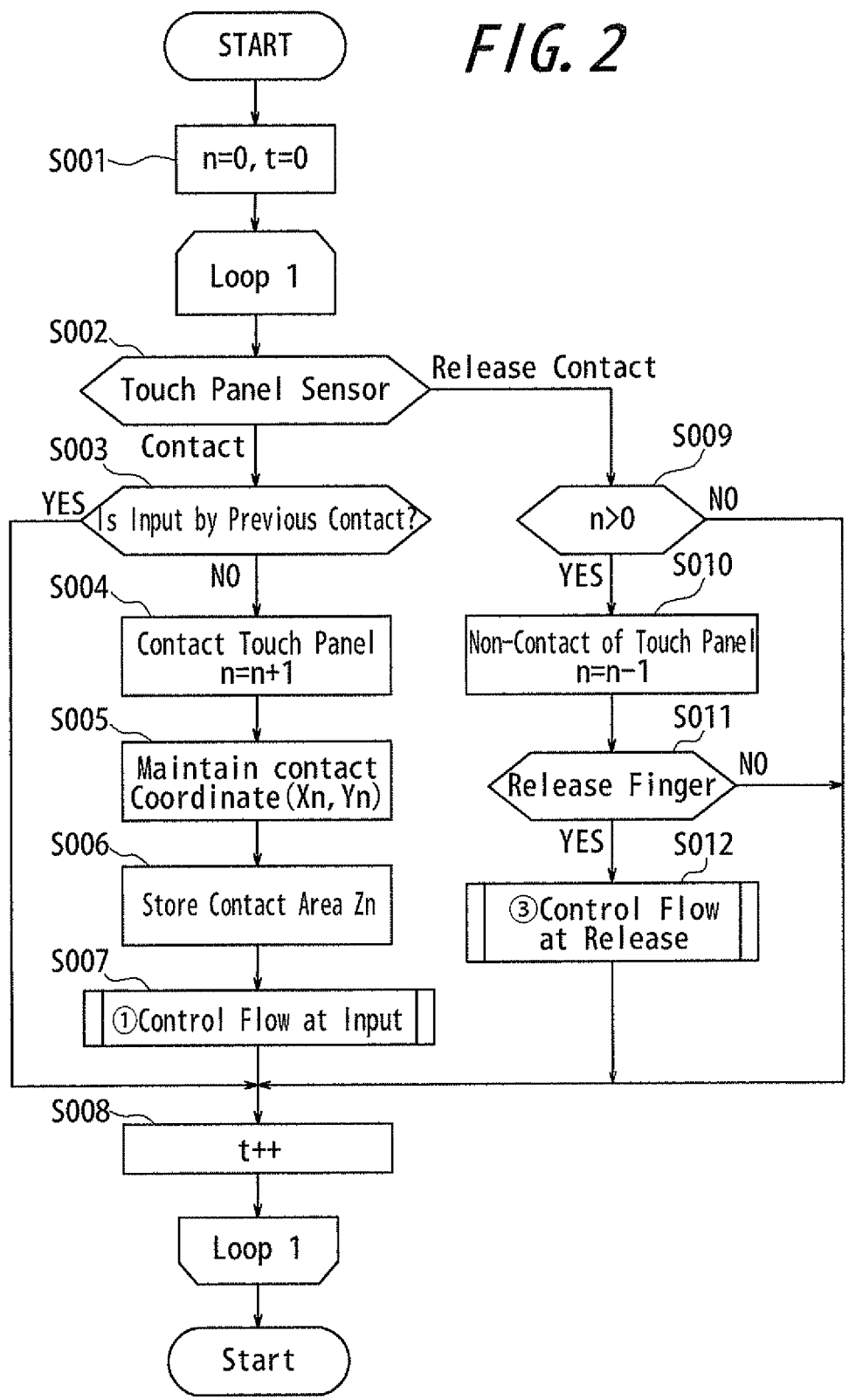
FIG. 2 is a flowchart illustrating operations of the mobile terminal according to the second embodiment of the present invention.

FIG. 2 is a flowchart illustrating operations by the mobile terminal according to the second embodiment of the present invention. Although the present embodiment describes that the first input means (input device) for the main input is a pen and the second input means (input device) for the sub input is a finger, the first input and the second input can be made by any other suitable input means.

Upon activation of the mobile terminal 2 by supplying power and the like, the control unit 80 initializes an input number n for counting the number of input means to the touch panel 21, and an elapsed time t as a parameter representative of an elapsed time (n=0, t=0) (step S001). If there is the input (touch) to the touch panel 21 (for example, if the pen or the finger touches the touch panel), the input means determination unit 71 determines whether the input is the one by a contact which has been completed, based on previous input information (for example, which input device is contacting the touch panel 21) and the like (step S003). If the input is new, the control unit 80 increases the input number n contacting the touch panel 21 by 1 (n=n+1) (step S004). Subsequently, after the input position determination unit 73 obtains/holds a contact coordinate (Xn, Yn) of the input (step S005) and the input device determination unit 72 obtains/holds a contact area Zn of the input (step S006), processing returns to a control flow at input (step S007).

In contrast, if the input to the touch panel 21 is not received or released (for example, if the pen or the finger is released from the touch panel) at step S002, the control unit 80 determines whether the input number n is larger than 0 (step S009). If the input number n is larger than 0, since one input is in a non-touch (release) state, the control unit 80 decrements the input number n (step S010). The input device determination unit 72 determines whether the input means released from the touch panel 21 is the finger (step S011). If the input device determination unit 72 determines that the input means released is the finger, the processing shifts to a control flow at release (step S012).

Processing from the step S002-S012 is performed as a loop while the mobile terminal 2 is operating, and the control unit 80 increases the elapsed time t in accordance with the number of times of the loop (t++) (step S008).

Figure 3:
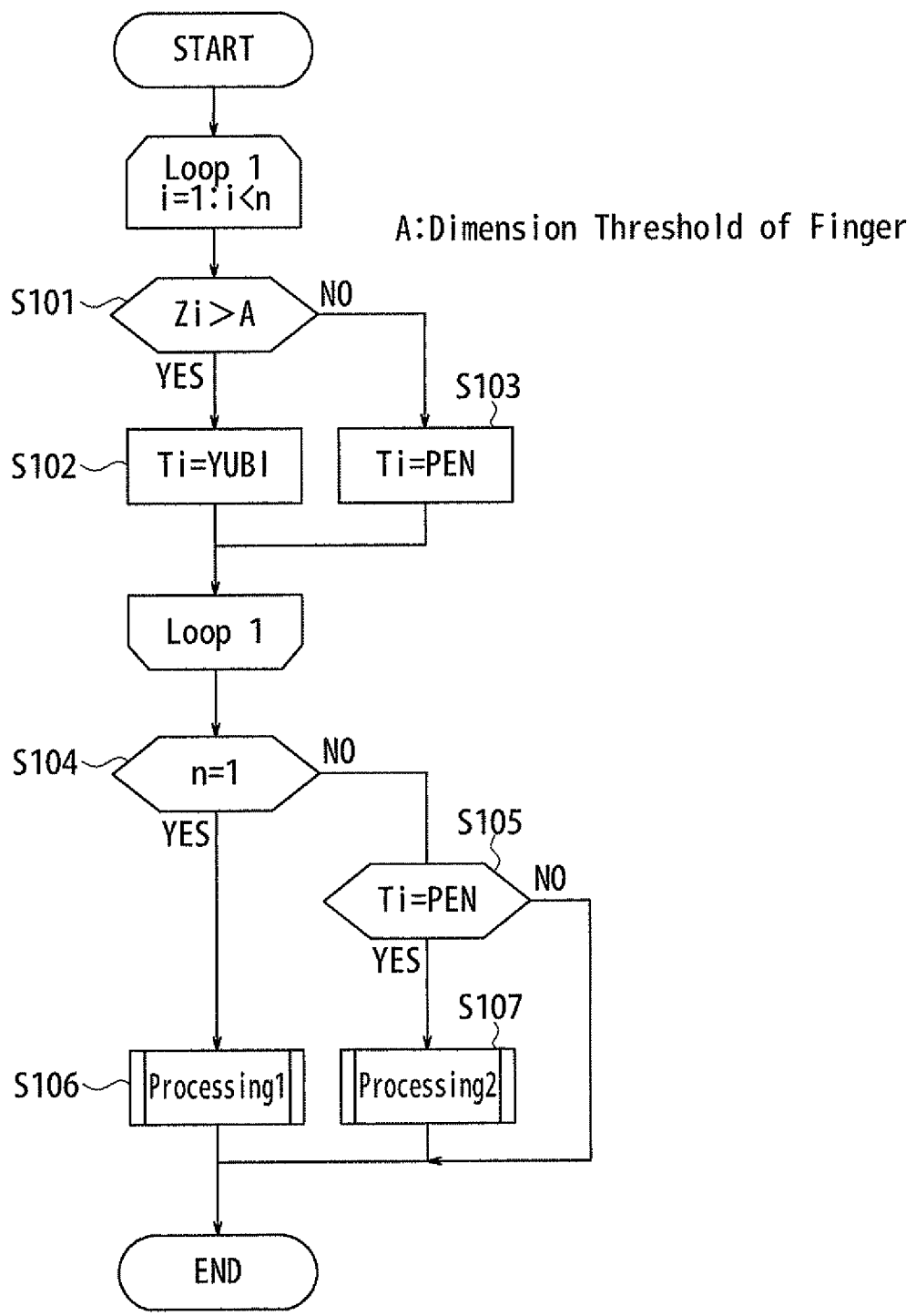
FIG. 3 is a flowchart illustrating a control flow at input by the mobile terminal according to the second embodiment of the present invention.

FIG. 3 is a flowchart illustrating a detailed control flow at input. The input device determination unit 72 determines whether the contact area Zi ($1 \leq i \leq n$) of the input is larger than an area threshold A for the finger (step S101). The input device determination unit 72 determines that the input means is the finger (Ti=YUBI) (step S102) if the contact area Zi is larger than the area threshold A (Yes of step S101), while determining that the input means is the pen (Ti=PEN) (step S103) if the contact are Zi is equal to or smaller than the area threshold A (No of step S201) (step S103). The steps S101-S103 is performed as a loop as many times as the input number n. Next, if the input number n is 1 (Yes of step S104), processing 1 is performed (step S106), whereas processing 2 is performed (step S107) if the input number n is not 1 and the input means is the pen (YES of step S105).

Figure 4:
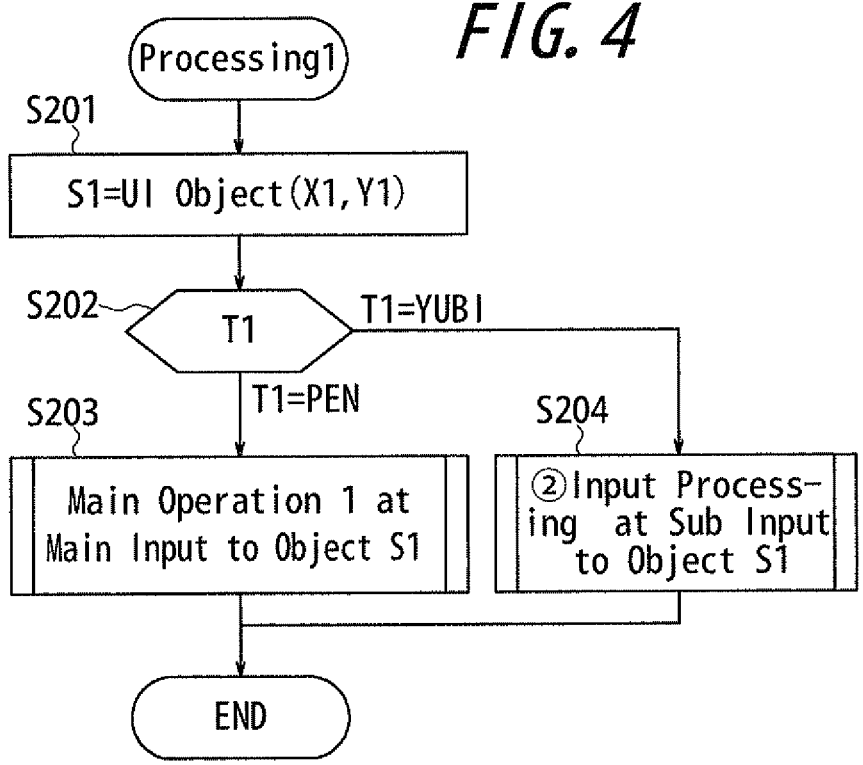
FIG. 4 is a flowchart illustrating processing 1 of the mobile terminal according to the second embodiment of the present invention.

FIG. 4 is a flowchart illustrating in detail the processing 1 (processing performed if the input number n is 1) shown at step S106 in FIG. 3. The object control unit 91 obtains the object definition information of a UI object S1 on a contact coordinate (X1,Y1) from the UI definition file 52 (step S201).

If the input means is the pen (main input) as the first input means (T1=PEN at step S202), the UI control unit 90 executes an operation (main operation) to the main input to the UI object S1 in response to such input event (step S203). If the input means is the finger (sub input) as the second input means (T1=YUBI at step S202), the UI control unit 90 executes an operation (sub operation) to the sub input to the UI object S1 in response to the input event (step S204).

Figure 6:
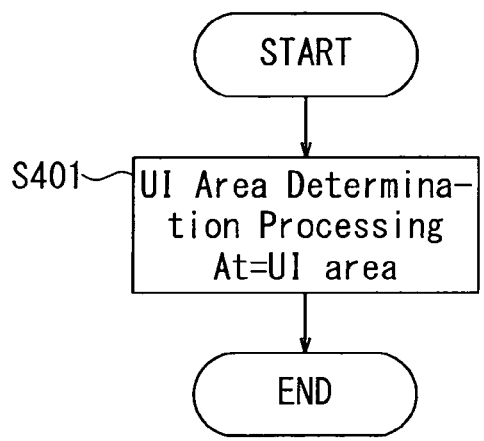
FIG. 6 is a flowchart illustrating a sub operation of a UI object of the mobile terminal according to the second embodiment of the present invention.
Figure 12:
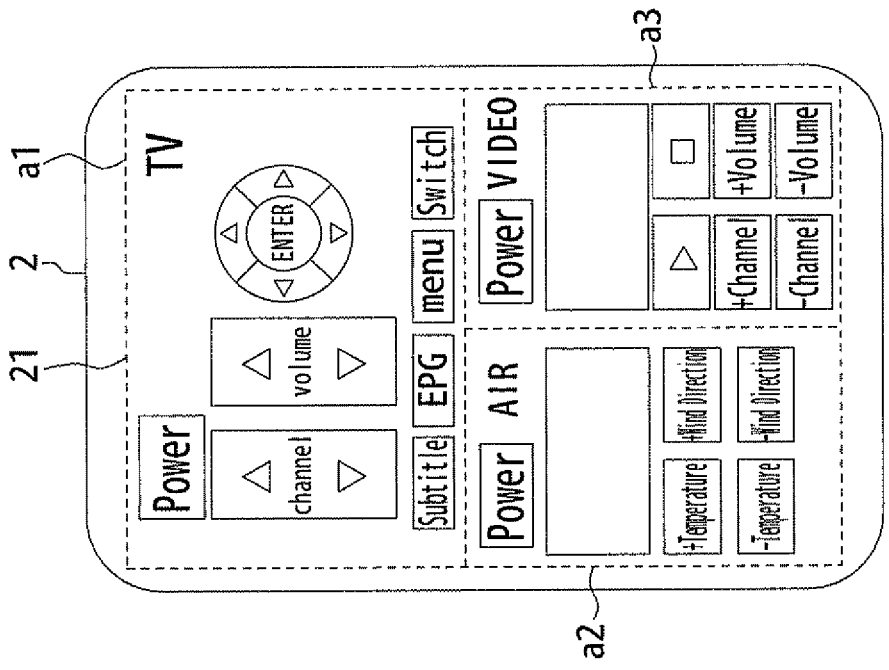
FIG. 12 shows diagrams illustrating examples of the stand-alone user interface and the compound user interface.

FIG. 6 is a flowchart illustrating the operation (sub operation) in detail in response to the sub input to the UI object shown at step S204 in FIG. 4. The control unit 80 determines a UI area At to which the finger input is performed based on the input coordinate (Xn, Yn) of the finger input (sub input) and stores the UI area At in the memory unit 50. The UI area At means, for example, each area such as a1-a3 in the compound UI shown in FIG. 12 (b) and b1 in the stand-alone UI shown in FIG. 12(a).

Figure 5:
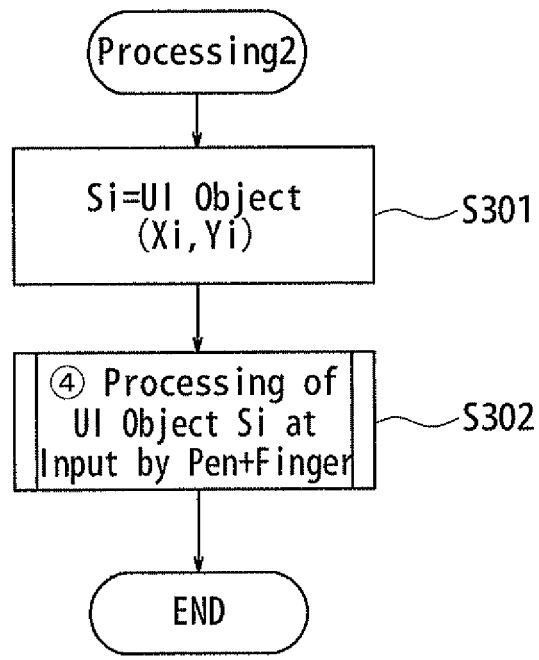
FIG. 5 is a flowchart illustrating processing 2 of the mobile terminal according to the second embodiment of the present invention.

FIG. 5 is a flowchart illustrating in detail the processing 2 (processing performed when the input number n is not 1 and the input device is the pen) shown at step S107 in FIG. 3. The object control unit 91 obtains the object definition information of the UI object Si on the contact coordinate (Xi, Yi) corresponding to the input i ($1 \leq i \leq n$) from the UI definition file 52 (step S301). Subsequently, the object control unit 91 executes processing of the UI objects corresponding to the plurality of inputs by the pen and the finger (step S302). Through the determination that the input number n is larger than 1 at step S104 in FIG. 3 and the determination whether a new input is by the pen or not at step S105, the processing 2 is performed, for example, when a predetermined soft key (UI object) is selected by the pen (first input means) while the finger (second input means) is touching the touch panel 21.

Figure 8:
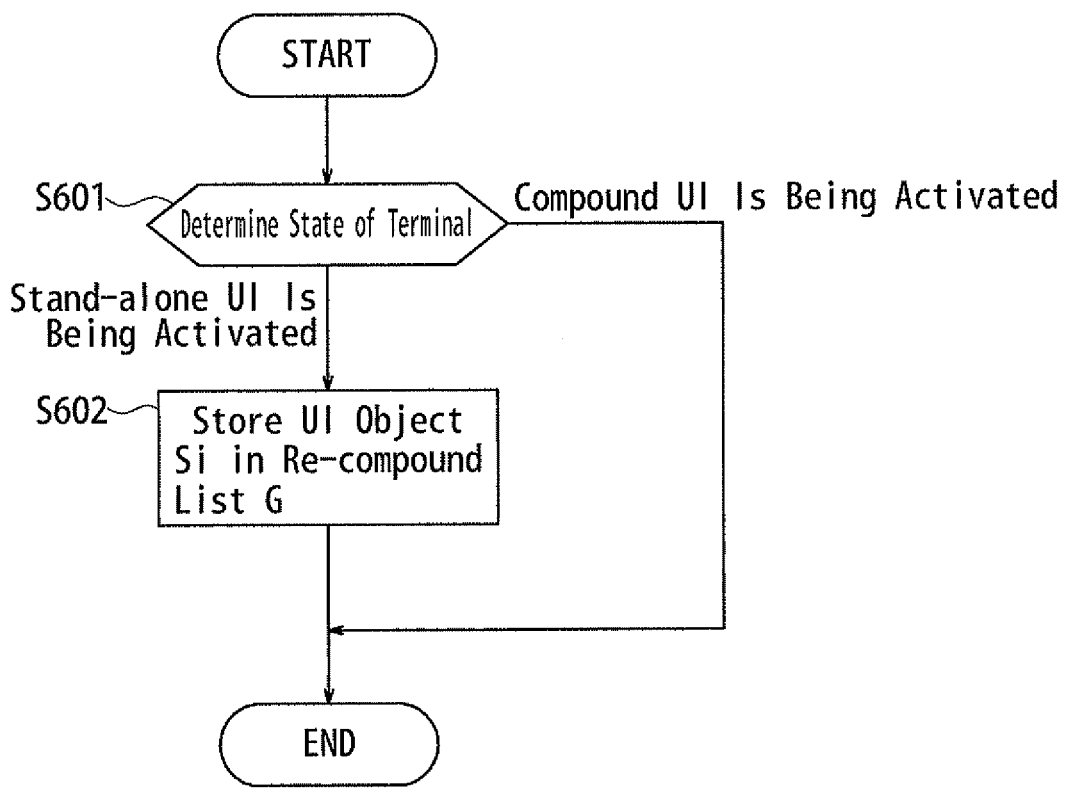
FIG. 8 is a flowchart illustrating operations at a main input and at a sub input by the mobile terminal according to the second embodiment of the present invention.

FIG. 8 is a flowchart illustrating in detail UI object processing corresponding to the plurality of inputs by the pen and the finger shown at step S302 in FIG. 5. The object control unit 91 determines a state of a UI displayed on the touch panel 21 (step S601) and, if a compound UI is being activated, ends the processing as it stands. In contrast, if the stand-alone UI is being activated, the object control unit 91 lists the UI objects which received the input by the pen (first input means) as the main input and stores such list as a re-compound list G in the memory unit 50 (step S602). The re-compound list G may be a list of selected UI objects, among the UI objects displayed in the stand-alone UI, desired by the user to display in the compound UI as well.

Figure 7:
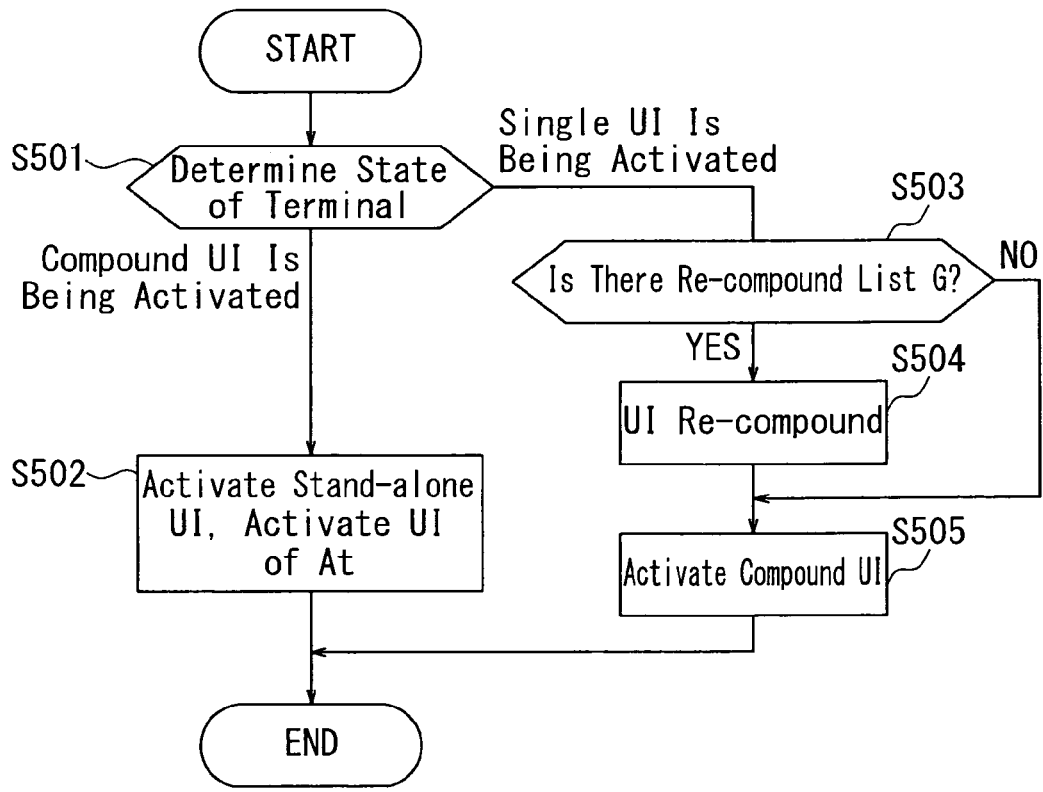
FIG. 7 is a flowchart illustrating a control flow at release by the mobile terminal according to the second embodiment of the present invention.

FIG. 7 is a flowchart illustrating the control flow at release shown at step S012 in FIG. 2. The object control unit 91 determines the state of the UI displayed on the touch panel 21 (step S501). If the compound UI is being activated, the object control unit 91 instructs the UI control unit 90 to obtain the UI area At representative of the UI area which received the input from the memory unit 50 and to activate a stand-alone UI of the user interface (for example, the TV remocon application) corresponding to the UI area At. Upon instruction by the object control unit 91, the UI control unit 90 displays the stand-alone UI of the user interface corresponding to the UI area At on the touch panel 21 (step S502). If the stand-alone UI is being activated, the object control unit 91 instructs the UI generation unit 13 to generate the compound UI, and the UI compound processing unit 60 of the UI generation unit 13 refers to the memory unit 50 to confirm if there is the re-compound list G (step S503). If there is the re-compound list G, the UI compound processing unit 60 re-compound data of the compound UI such that the UI objects included in the re-compound list G are displayed on the touch panel 21 (step S504) and the UI control unit 90 displays the compound UI on the touch panel 21 (step S505). The re-compound processing may, for example, replace the UI objects of the low priority among the UI objects included in a previous compound UI with the UI objects included in the re-compound list G. If there is no re-compound list G, the UI control unit 90 displays the compound UI on the touch panel 21 according to data of the previous compound UI (step S505). The UI compound processing unit 60 may store the data of the previous compound UI in the memory unit 50. At steps S501 and S601 of flowcharts in FIG. 7 and FIG. 8, each control flow proceeds to step S503 and step S602, respectively, if the stand-alone UI is being activated. Here, the stand-alone UI is the stand-alone UI after switchover from the compound UI. Therefore, if a normal stand-alone UI is displayed before generation of the compound UI, it is possible to refrain from performing a sequence of the above processing.

(UI Switchover from Compound UI to Stand-Alone UI According to Second Embodiment)

Figure 9:
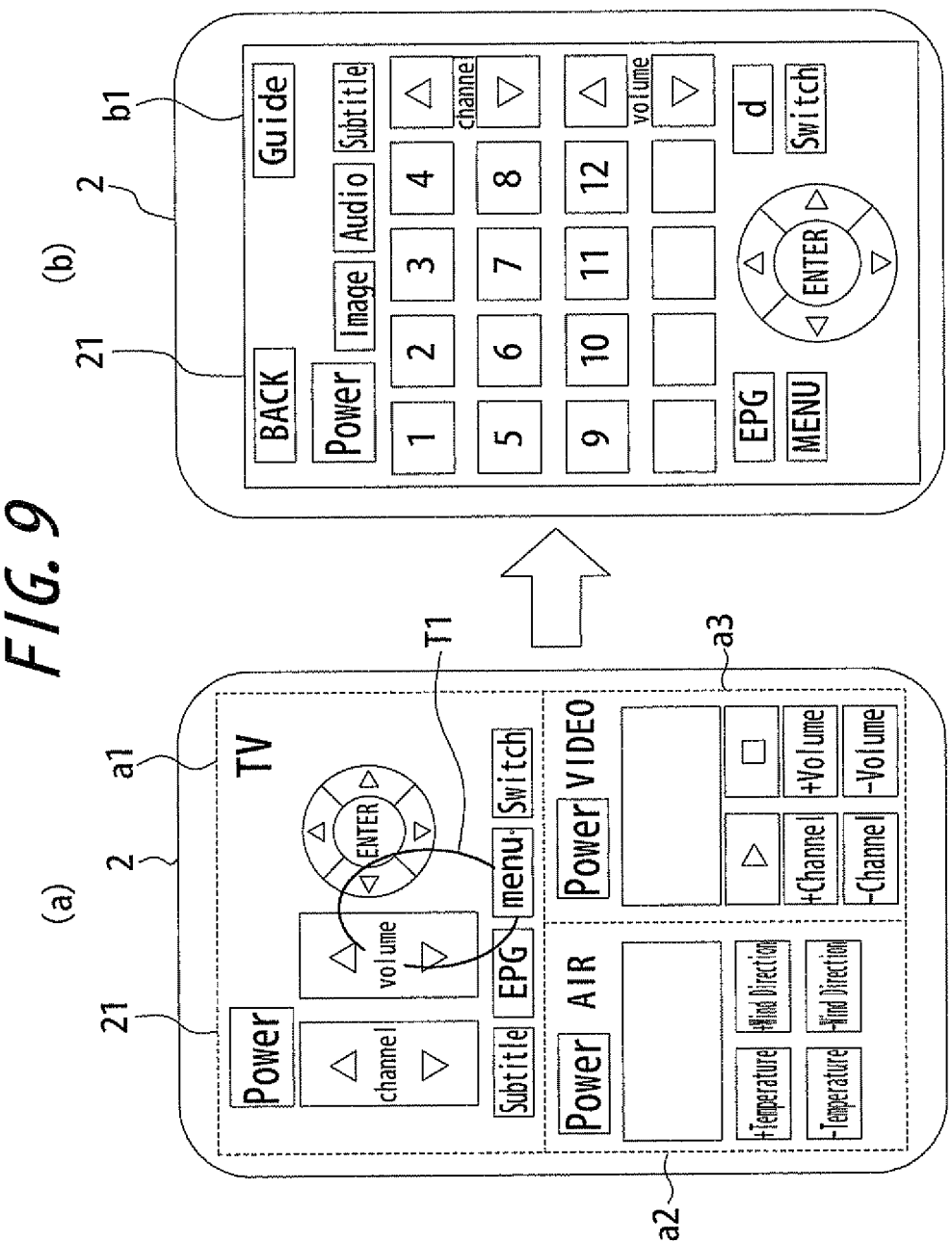
FIG. 9 shows diagrams illustrating UI switchover from the compound UI to the stand-alone UI by the mobile terminal according to the second embodiment of the present invention.

FIG. 9 is a diagram illustrating UI switchover from the compound UI to the stand-alone UI by the mobile terminal according to one embodiment of the present invention. In FIG. 9(*a*), the touch panel 21 of the mobile terminal 2 displays a compound UI in which the TV remocon application UI (a1), the air conditioner remocon application UI (a2), and the video remocon application UI (a3) are compounded. When there is the input T1 (sub input) by the finger as the second input means to the mobile terminal 2 in FIG. 9(*a*), the touch panel 21 of the mobile terminal 2 switches display to the stand-alone UI (FIG. 9(*b*)). The stand-alone UI shows the TV remocon application UI (a1) arranged at a position of the finger input T1 as a stand-alone interface (b1).

According to the present embodiment, first, when the finger input T1 as shown in FIG. 9(*a*), the processing at step S002-S007 show in FIG. 2 is performed to carry out the control flow at input corresponding to the finger input. Since the input number n is 1 in the control flow at input shown in FIG. 3, the processing 1 at step S106 is performed. In the processing 1 shown in FIG. 4, the sub operation corresponding to the finger input (sub input) is performed (step S204), and the UI area At (a1 according to the present embodiment) specified by the finger input is stored in the memory 50 in the sub operation shown in FIG. 6 (step S401).

Subsequently, when the finger input T1 is released as shown in FIG. 9(*a*), the processing at step S002 shown in FIG. 2 branches off to steps S009-S012 to perform the control flow at release corresponding to the finger input (step S012). Since the compound UI is being activated in FIG. 9(*a*) in the control flow at release shown in FIG. 7, the stand-alone UI (b1) of the TV remocon application (At=a1) is activated based on the UI area information (At) stored (step S502).

According to the present invention, as set forth above, the user can initiate the stand-alone UI desired by the user by performing the input by the finger (sub input) as the second input means to a predetermined area of the compound UI. Hence, the user can switch from the compound UI to the stand-alone UI by a very simple operation.

(UI Switchover from Stand-Alone UI to Compound UI According to Second Embodiment)

Figure 10:
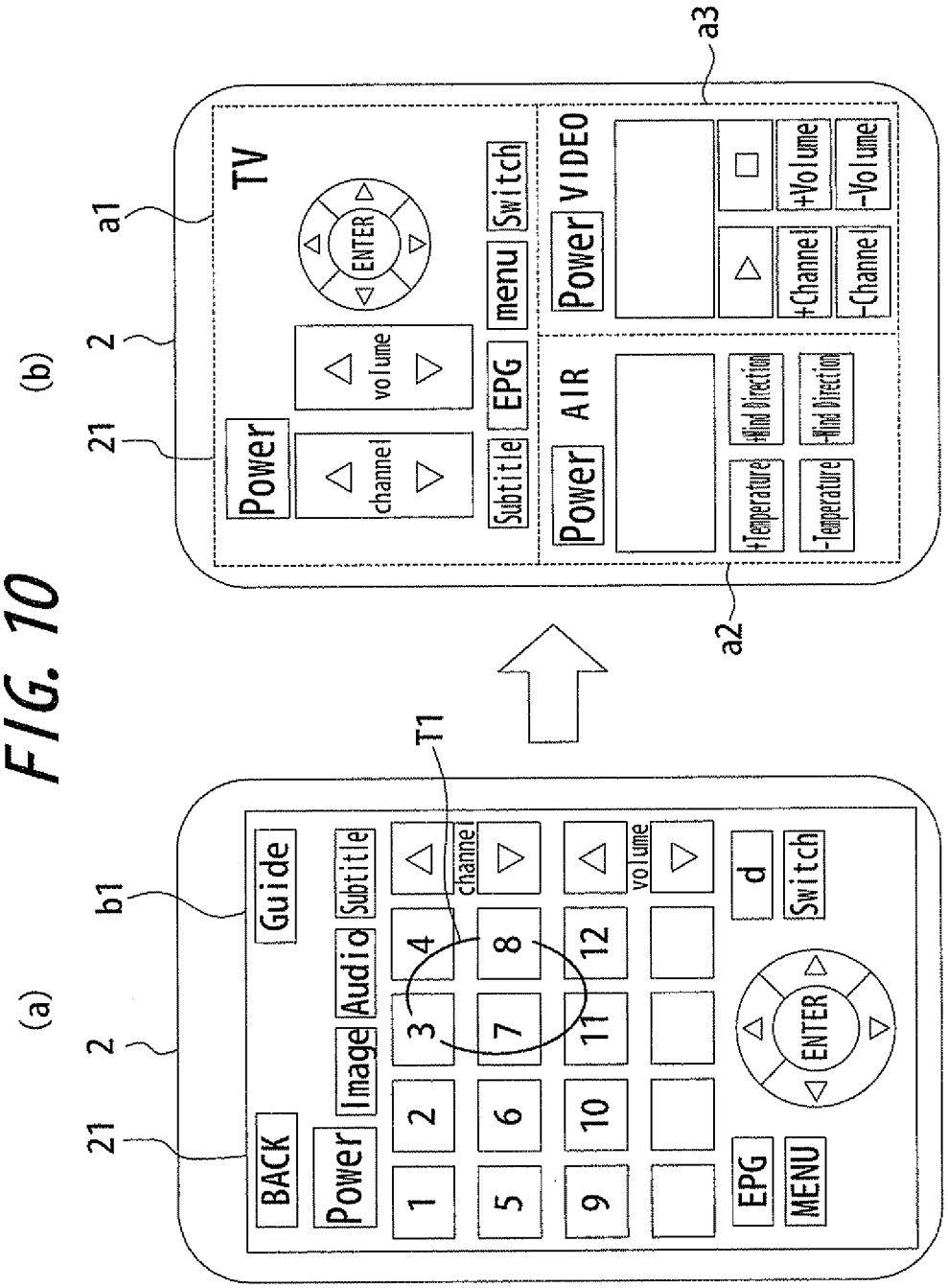
FIG. 10 shows diagrams illustrating UI switchover from the stand-alone UI to the compound UI by the mobile terminal according to the second embodiment of the present invention.

FIG. 10 is a diagram illustrating UI switchover from the stand-alone UI to the compound UI by the mobile terminal according to an embodiment of the present invention. As shown in FIG. 10(*a*), the touch panel 21 of the mobile terminal 2 displays a stand-alone UI which is the stand-alone UI (b1) of the TV remocon application. When there is a finger input T1 as the sub input (second input) to the mobile terminal 2 in FIG. 10(*a*), the touch panel 21 of the mobile terminal 2 switches display to the compound UI (FIG. 10(*b*)). This compound UI is composed of the TV remocon application UI (a1), the air conditioner remocon application UI (a2) and the video remocon application UI (a3).

According to the present embodiment, first, when there is the finger input T1 as shown in FIG. 10(*a*), the processing proceeds to steps S002-S007 shown in FIG. 2 to perform the control flow at input corresponding to the finger input. Since the input number n is 1 in the control flow at input shown in FIG. 3, the processing n1 at step S106 is performed. In the processing 1 shown in FIG. 4, the sub operation corresponding to the finger input (sub input) is performed (step S204), and the UI area At by the finger input is stored in the memory 50 in the sub operation shown in FIG. 6 (step S401).

Subsequently, when the finger input T1 in FIG. 10(*a*) is released, the processing at step S002 shown in FIG. 2 branches off to steps S009-S012 to perform the control flow at release corresponding to the finger input (step S012). Since the stand-alone UI is being activated in FIG. 10(*a*), the control flow at release shown in FIG. 7 confirms the re-compound list G. However, since there is no re-compound list G according to the present embodiment, the previous compound UI (a1-a3) is displayed on the touch panel 21 as shown in FIG. 10(*b*) (step S505).

According to the present embodiment as described above, the user can activate the compound UI only by performing the input by the finger (sub input) as the second input means to the stand-alone UI. Hence, the user can switch over from the stand-alone UI to the compound UI by a very simple operation.

(Re-Compound of Compound UI According to Second Embodiment)

Figure 11:
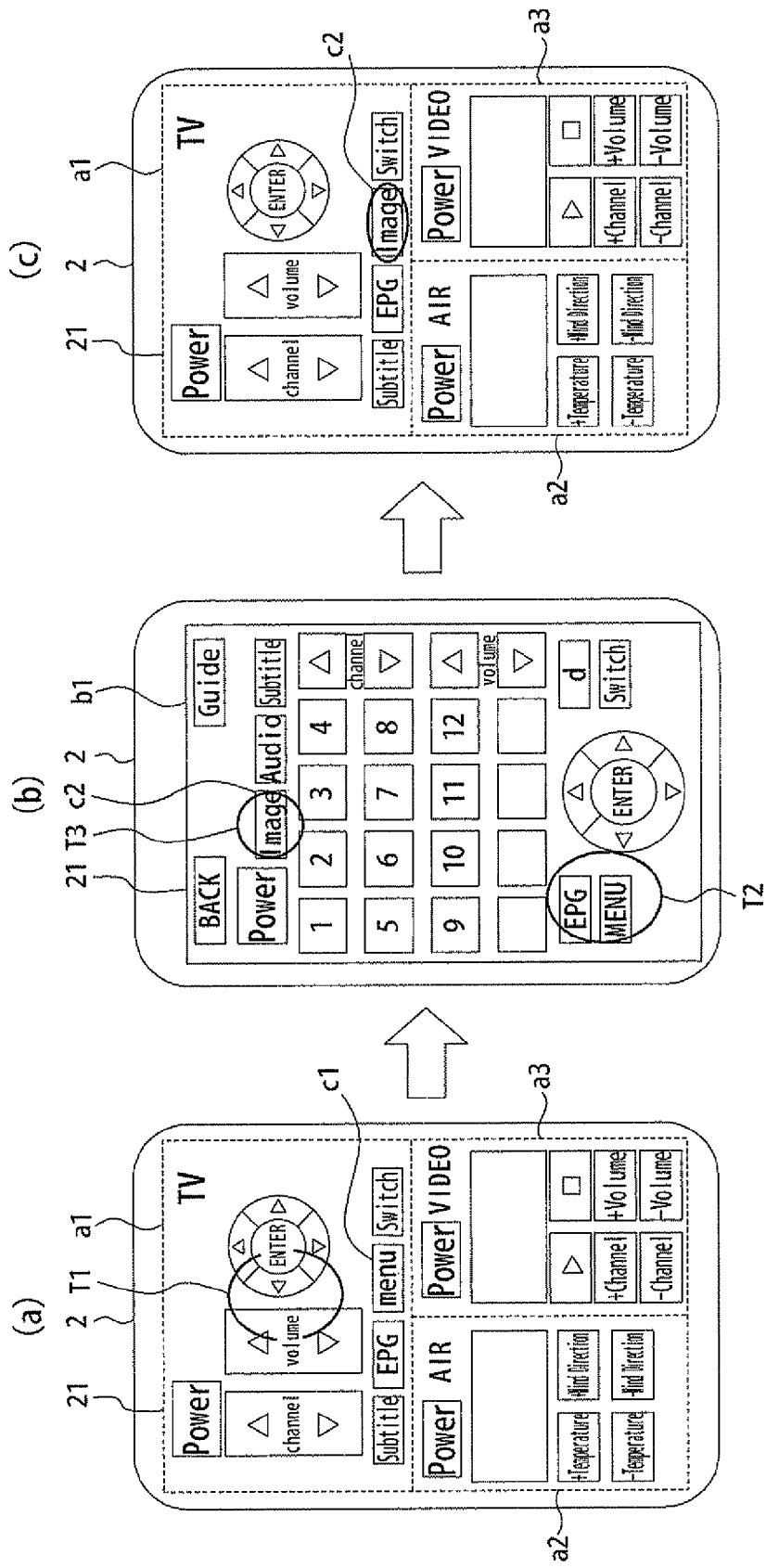
FIG. 11 shows diagrams illustrating re-compound of the compound UI by the mobile terminal according to the second embodiment of the present invention.

FIG. 11 is a re-compound processing of the compound UI by the mobile terminal according to one embodiment of the present invention. In FIG. 11(*a*), the touch panel 21 of the mobile terminal 2 displays a compound UI in which the TV remocon application UI (a1), the air conditioner remocon application UI (a2) and the video remocon application UI (a3) are compounded. The compound UI in FIG. 11(*b*) includes a menu key C1. When there is a finger input T1 as the sub input (second input means) to the mobile terminal 2 in FIG. 11(*a*), the touch panel 21 of the mobile terminal 2 switches display to the stand-alone UI (FIG. 11(*b*)). The stand-alone UI shows the TV remocon application UI (a1) arranged at the position of the finger input T1 as the stand-alone interface (b1). In FIG. 11(*b*), while the finger (T2) as the second input means is contacting the touch panel 21, an input T3 by the pen as the first input means is performed to a video key C2. Then, when the finger input T2 is released from the touch panel 21 of the mobile terminal 2 in FIG. 11(*b*), the touch panel 21 of the mobile terminal 2 switches display to the compound UI (FIG. 11(*c*)). This compound UI is composed of the TV remocon application UI (a1), the air conditioner remocon application UI (a2) and the video remocon application UI (a3). In the compound UI in FIG. 11(*c*), the video key C2 specified in FIG. 11(*b*) is displayed in place of the menu key C1.

According to the present embodiment, since switchover from the compound UI in FIG. 11(*a*) to the stand-alone UI in FIG. 11(*b*) is the same as that according to the first embodiment, thus a description thereof is omitted.

According to the present embodiment, when there is the finger input T2 as shown in FIG. 11(*b*), the processing proceeds to steps S002-S007 shown in FIG. 2 to perform the control flow at input corresponding to the finger input. Since the input number n is 1 in the control flow at input shown in FIG. 3, the processing n1 at step S106 is performed. In the processing 1 shown in FIG. 4, the sub operation corresponding to the finger input (sub input) is performed (step S204), and the UI area At indicated by the finger input is stored in the memory 50 in the sub operation shown in FIG. 6 (step S401).

In FIG. 11(b), while the finger input T2 as the second input means is contacting the touch panel 21, the pen input T3 (first input means) is performed to the touch panel 21. In response to that, the processing proceeds to steps S002-S007 shown in FIG. 2 to perform the control flow at input corresponding to the finger input. Since the input number n is 2 in the control flow at input shown in FIG. 3 and the input is carried out by the pen, the processing 2 at step S107 is performed. In the processing 2 shown in FIG. 5, the UI object processing corresponding to a plurality of inputs by the pen and the finger is performed (step S302). As shown in FIG. 8, since the stand-alone UI is activated on the touch panel 21, the UI object (video key C2 according to the present embodiment) indicated by the pen input is stored in the re-compound list G (step S602). In addition, a release operation of the pen input T3 while there is the finger input T2 does not cause switchover of the UI by branch off from step S011 shown in FIG. 2.

Subsequently, when the finger input T2 in FIG. 11(b) is released, the processing at step S002 shown in FIG. 2 branches off to steps S009-S012 to perform the control flow at release corresponding to the finger input (step S012). In the control flow at release shown in FIG. 7, since the stand-alone UI is being activated in FIG. 11(a), the re-compound list G is confirmed. According to the present embodiment, since there is the re-compound list G including the video key C2, re-compound processing (replacement of the menu key C1 with the video key C2 according to the present embodiment) of the compound UI based on contents of the re-compound list G is performed (step S504). Then, the compound UI re-compounded is displayed on the touch panel 21 (step S505). In the re-compound processing, the UI object specified by the pen input may either be displayed additionally to the compound UI, or displayed replacing the UI object with the low priority among the UI objects already displayed in the compound UI.

According to the present embodiment, as set forth above, the user can display a UI object that he desires in the compound UI through a very simple operation to indicate the UI object in the stand-alone UI by the input by the pen (main input) as the first input means while there is the input by the finger (sub input) as the second input means on the touch panel.

It is to be noted that the present invention is not limited to the embodiment set forth above but may be varied or modified in a multiple manner. For example, although the touch sensor of the surface elastic type is used in the above embodiments, the present invention can also be implemented using the touch sensor of a sensor type. In addition, although the PDA is used by way of example in the above embodiments, the present invention is applicable widely to mobile wireless terminals such as the mobile phones and portable terminals such as portable game players, portable audio players, portable video players, portable electronic dictionaries, portable digital book viewers and the like. Moreover, although the pen input is defined as the main input and the finger input is defined as the sub input in the descriptions above, the present invention is also applicable to a case in which the finger input is defined as the main input and the pen input is defined as the sub input. The present invention is also applicable to a case in which the input number is 3 or more.

REFERENCE SIGNS LIST 1 mobile phone
2 mobile terminal
20, 21 touch panel
24, 23 display unit
22, 25 input unit
10, 80 control unit
11 application program execution unit
12 user interface obtaining unit
13 user interface generation unit
14 timing unit
15 user interface event processing unit
30 wireless communication unit
40 infrared communication unit
50 memory unit
71 input means determination unit
72 input device determination unit
73 input position determination unit
90 user interface control unit
91 object control unit
50 memory unit
51 application memory area
52 user interface definition file memory area
53 individual user interface resource memory area
54 common user interface resource memory area
55 relevant application program information memory area
56 compound user interface definition file memory area
60 user interface compound processing unit
61 user interface object definition information analysis unit
62 user interface object selection processing unit
63 compound user interface definition file generation unit
64 automatic layout processing unit
65 user interface resource shaping unit

The invention claimed is:

1. A mobile user interface generation apparatus for generating user interfaces of mobile terminals, the user interface generation apparatus comprising:
   a memory unit capable of storing an application program;
   a control unit, based on the application program stored in the memory unit, for controlling, when receiving instruction to generate one user interface pertaining to a remote appliance, to display a stand-alone user interface object group corresponding to the one user interface, and for controlling, when receiving instruction to generate a plurality of user interfaces each pertaining to a different remote appliance, to display a compound user interface object group by performing compound processing on user interface objects extracted from stand-alone user interface object groups corresponding to the plurality of user interfaces respectively, the compound user interface object group including only a portion of available user interface objects from each stand-alone user interface object group;
   a display unit for displaying the stand-alone user interface object group or the compound user interface object group; and
   an input unit, arranged at front face of the display unit in relation to the display unit, for receiving a first input by a first input means and a second input by a second input means, wherein
   the first input is an area input or a point input, and the second input is the other of the area input and the point input, the point input defining an input that contacts the input unit with a contact area less than a predetermined threshold, and the area input defining an input that contacts the input unit with a contact area greater than or equal to the predetermined threshold,
   if the input unit receives the first input, the control unit executes a function of a user interface object corresponding to a reception position of the first input, and if the input unit receives the second input while the control unit controls to display the compound user interface object group, the control unit displays a stand-alone user interface object group of a user interface displayed correspondingly to a reception position of the second input in the compound user interface object group.

2. The user interface generation apparatus according to claim 1, wherein when the control unit controls to display the stand-alone user interface object group of the user interface displayed correspondingly to the reception position of the second input in the compound user interface object group, and if the input unit further receives a second input, the control unit controls to display the compound user interface object group displayed before the stand-alone user interface object group.

3. The user interface generation apparatus according to claim 1, wherein after the control unit controls to display the stand-alone user interface object group of the user interface displayed correspondingly to the reception position of the second input in the compound user interface object group, when the input unit receives a first input to a user interface object in the stand-alone user interface object group while a further second input is kept pressing down, and if the further second input is released, the control unit controls to display a compound user interface object group on which re-compound processing is performed with the user interface object corresponding to the first input and user interfaces included in the compound user interface object group displayed before the stand-alone user interface object group.

4. The user interface generation apparatus according to claim 3, wherein the control unit performs the re-compound processing by additionally displaying the user interface object corresponding to the first input to the compound user interface object group displayed before the stand-alone user interface object group.

5. The user interface generation apparatus according to claim 3, wherein the control unit performs the re-compound processing by replacing a user interface object with a low priority among user interface objects included in the compound user interface object group displayed before the stand-alone user interface object group with the user interface object corresponding to the first input.

\* \* \* \* \*

UNITED STATES PATENT AND TRADEMARK OFFICE
CERTIFICATE OF CORRECTION

| | | |
|---|---|---|
| PATENT NO. | : 8,726,158 B2 | Page 1 of 1 |
| APPLICATION NO. | : 13/060626 | |
| DATED | : May 13, 2014 | |
| INVENTOR(S) | : Kenta Kinoshita | |

It is certified that error appears in the above-identified patent and that said Letters Patent is hereby corrected as shown below:

On the Title Page, Item (54) and in the Specification, Column 1

Please delete the following:

"USER INTERFACE GENERATION APPARATUS"

And replace with the following:

USER INTERFACE GENERATION APPARATUS FOR GENERATING USER INTERFACES OF MOBILE TERMINALS

Signed and Sealed this
Eighth Day of September, 2015

Michelle K. Lee
*Director of the United States Patent and Trademark Office*